United States Patent
Liu et al.

(10) Patent No.: US 12,402,086 B2
(45) Date of Patent: Aug. 26, 2025

(54) METHOD FOR COMPUTING POWER SHARING AND RELATED DEVICES

(71) Applicant: SPREADTRUM SEMICONDUCTOR (NANJING) CO., LTD., Jiangsu (CN)

(72) Inventors: Yingying Liu, Jiangsu (CN); Runquan Miao, Jiangsu (CN); Ming Sun, Jiangsu (CN)

(73) Assignee: SPREADTRUM SEMICONDUCTOR (NANJING) CO., LTD., Nanjing (CN)

( * ) Notice: Subject to any disclaimer, the term of this patent is extended or adjusted under 35 U.S.C. 154(b) by 394 days.

(21) Appl. No.: 18/040,221

(22) PCT Filed: Jul. 28, 2021

(86) PCT No.: PCT/CN2021/108999
§ 371 (c)(1),
(2) Date: Feb. 1, 2023

(87) PCT Pub. No.: WO2022/022584
PCT Pub. Date: Feb. 3, 2022

(65) Prior Publication Data
US 2023/0319734 A1 Oct. 5, 2023

(30) Foreign Application Priority Data

Jul. 29, 2020 (CN) .......................... 202010748884.4

(51) Int. Cl.
*H04W 52/34* (2009.01)
(52) U.S. Cl.
CPC ................................ *H04W 52/346* (2013.01)
(58) Field of Classification Search
CPC .... H04W 52/34; H04W 52/346; H04L 65/40; H04L 67/60
See application file for complete search history.

(56) References Cited

U.S. PATENT DOCUMENTS 6,226,281 B1 * 5/2001 Cordier ............... H04W 52/346
370/335
8,547,910 B2 * 10/2013 Chakrabarti .......... H04W 72/00
370/468
(Continued)

FOREIGN PATENT DOCUMENTS

CN 102067696 A 5/2011
CN 106572142 A 4/2017
(Continued)

OTHER PUBLICATIONS

Notice of Reasons for Refusal issued for Japanese Application No. 2023-505680 mailed on Jan. 19, 2024, 8 Pages.
(Continued)

*Primary Examiner* — Hai V Nguyen
(74) *Attorney, Agent, or Firm* — HAUPTMAN HAM, LLP

(57) ABSTRACT

A method for computing power sharing and related devices are provided. The method is applied to a visit computing power sharing function (V-CPSF). The V-CPSF obtains a sharing authorization request of a first network terminal, where the sharing authorization request carries a computing power sharing request. The V-CPSF obtains first sharing request response information returned by a second network terminal in response to the computing power sharing request, and then obtains authorization request response information generated by processing the sharing authorization request by a home computing power sharing function (H-CPSF), where when the sharing authorization request passes, the authorization request response information includes computing power sharing request response information generated by processing the computing power sharing request by the H-CPSF based on at least one of the first sharing request response information or second sharing
(Continued)

request response information, and sends the authorization request response information to the first network terminal.

20 Claims, 14 Drawing Sheets

(56) References Cited

U.S. PATENT DOCUMENTS

| | | | | |
|---|---|---|---|---|
| 8,774,119 | B2* | 7/2014 | Chakrabarti | H04W 16/14 |
| | | | | 370/329 |
| 9,154,946 | B2* | 10/2015 | Knobbe | H04W 12/122 |
| 10,904,712 | B2* | 1/2021 | Lu | H04W 4/06 |
| 11,876,856 | B2* | 1/2024 | Liu | H04L 65/40 |
| 11,889,391 | B2* | 1/2024 | Shan | H04W 12/08 |
| 12,170,929 | B2* | 12/2024 | Kim | H04W 48/12 |
| 12,262,295 | B2* | 3/2025 | Kim | H04L 69/40 |
| 2006/0049691 | A1* | 3/2006 | Deprez | B60W 30/18027 |
| | | | | 303/191 |
| 2012/0307765 | A1* | 12/2012 | Chakrabarti | H04W 16/14 |
| | | | | 370/329 |
| 2017/0141903 | A1* | 5/2017 | Xu | H04L 1/0011 |
| 2018/0227718 | A1* | 8/2018 | Lu | H04W 4/06 |
| 2018/0329442 | A1* | 11/2018 | Hohm | H04L 67/125 |
| 2019/0174449 | A1* | 6/2019 | Shan | H04W 60/04 |
| 2020/0014520 | A1* | 1/2020 | Xu | H04L 5/0055 |
| 2020/0229069 | A1* | 7/2020 | Chun | H04W 76/30 |
| 2022/0053449 | A1* | 2/2022 | Shan | H04W 36/0066 |
| 2022/0095260 | A1* | 3/2022 | Shan | H04W 60/04 |
| 2022/0104164 | A1* | 3/2022 | Kedalagudde | H04W 8/12 |
| 2022/0217519 | A1* | 7/2022 | Kim | H04L 69/40 |
| 2023/0144062 | A1* | 5/2023 | Liu | H04L 67/10 |
| | | | | 709/224 |
| 2023/0156553 | A1* | 5/2023 | Kim | H04W 60/04 |
| | | | | 455/436 |

FOREIGN PATENT DOCUMENTS

| | | |
|---|---|---|
| CN | 107430712 A | 12/2017 |
| CN | 111131412 A | 5/2020 |
| JP | 2007515814 A | 6/2007 |
| JP | 2011526130 A | 9/2011 |
| JP | 2016529579 A | 9/2016 |
| JP | 2020519061 A | 6/2020 |
| WO | 2020150333 A1 | 7/2020 |

OTHER PUBLICATIONS

WIPO, International Search Report and Written Opinion for International Application No. PCT/CN2021/108999, Sep. 29, 2021.

* cited by examiner

METHOD FOR COMPUTING POWER SHARING AND RELATED DEVICES

CROSS-REFERENCE TO RELATED APPLICATION(S)

This application is a National Stage of International Application No. PCT/CN2021/108999, field on Jul. 28, 2021, which claims priority to Chinese Patent Application No. 202010748884.4, filed on Jul. 29, 2020, both of which are incorporated by reference herein.

TECHNICAL FIELD

This disclosure relates to the field of computing technology, in particular to a method for computing power sharing and related devices.

BACKGROUND

With the advent of the big data era, computing power becomes an important productivity in the digital economy era. During continuous breakthroughs in emerging technologies, computing power, as a "fuel" that drives technological progress, has become an emerging "energy".

In the related art, some applications require huge computing power, and it may take a considerable time if centralized computing is adopted, which is a technical problem to-be-solved.

SUMMARY

In a first aspect, implementations of the disclosure provide a method for computing power sharing. The method is applied to a visit computing power sharing function (V-CPSF) coupled with a home computing power sharing function (H-CPSF). The V-CPSF and the H-CPSF are each a computing power sharing function (CPSF) and the CPSF is connected with a network for control plane transmission and data plane transmission, or the CPSF is connected with the network for control plane transmission.

The method includes: obtaining a sharing authorization request sent by a first network terminal, where the first network terminal is a roaming computing power demand terminal or a roaming computing power providing terminal, and the sharing authorization request carries a computing power sharing request; obtaining first sharing request response information returned by a second network terminal in response to the computing power sharing request, where the second network terminal is a computing power demand terminal or a computing power providing terminal belonging to a visit public land mobile network (V-PLMN); sending the sharing authorization request and the first sharing request response information to the H-CPSF; obtaining authorization request response information generated by processing the sharing authorization request by the H-CPSF, where when the sharing authorization request passes, the authorization request response information includes a computing power sharing request response information generated by processing the computing power sharing request by the H-CPSF based on at least one of the first sharing request response information or second sharing request response information, and where the second sharing request response information is response information returned by a third network terminal in response to the computing power sharing request, and the third network terminal is a computing power demand terminal or a computing power providing terminal belonging to a home public land mobile network (H-PLMN); and sending the authorization request response information to the first network terminal.

In a second aspect, implementations of the disclosure provide a V-CPSF. The V-CPSF is connected with a network for control plane transmission and data plane transmission or connected with the network for control plane transmission. The V-CPSF includes a transceiver, a memory for storing computer programs, and a processor coupled with the memory and the transceiver. The processor is configured to invoke the computer programs to perform the method of the first aspect.

In a third aspect, implementations of the disclosure provide a non-transitory computer storage medium. The non-transitory computer storage medium stores a computer program. The computer program includes program instructions. When executed by a processor, the program instructions perform the method of the first aspect.

BRIEF DESCRIPTION OF THE DRAWINGS

To describe technical solutions in implementations of the disclosure more clearly, the following will give a brief introduction to accompanying drawings required for describing implementations. Apparently, the accompanying drawings hereinafter described are some implementations of the disclosure. Based on these drawings, those of ordinary skill in the art can also obtain other drawings without creative effort.

DETAILED DESCRIPTION

Figure 1A:
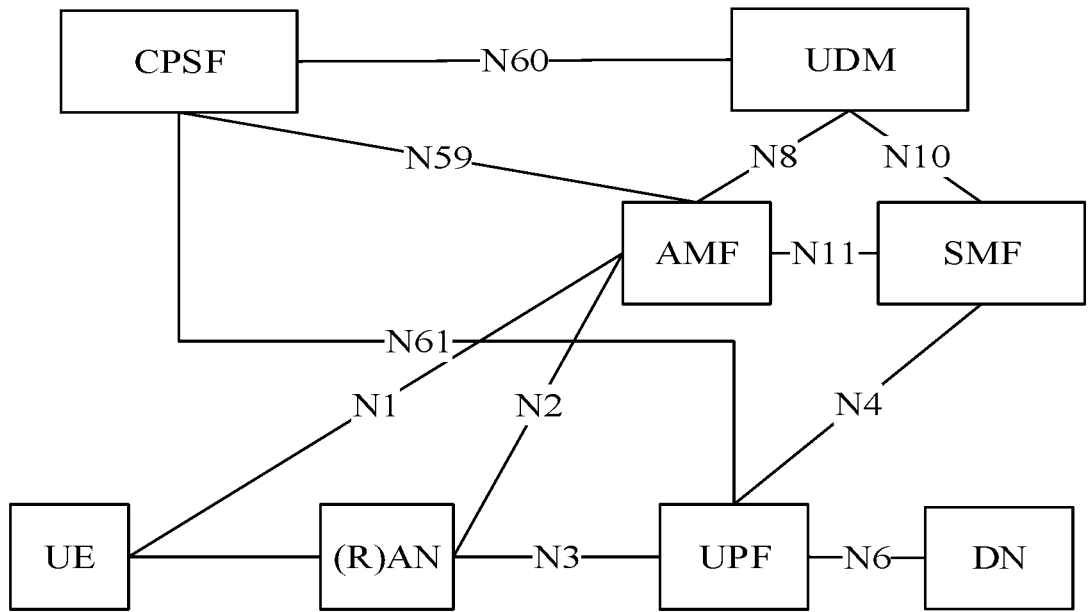
FIG. 1A and FIG. 1B each are a schematic diagram of connections between a computing power sharing function (CPSF) and reference points of a core network provided in implementations of the disclosure.

The following will illustrate clearly and completely technical solutions in implementations of the disclosure with reference to the accompanying drawings of implementations of the disclosure.

It can be understood that, the terms "first", "second", and the like used in the specification, the claims, and the accompany drawings of the disclosure are used to distinguish different objects rather than describe a particular order. In addition, the terms "include", "comprise", and "have" as well as variations thereof are intended to cover non-exclusive inclusion. For example, a process, method, system, product, or device including a series of steps or units is not limited to the listed steps or units, on the contrary, it can optionally include other steps or units that are not listed; alternatively, other steps or units inherent to the process, method, product, or device can also be included either.

The term "embodiment" or "implementation" referred to herein means that a particular feature, structure, or feature described in conjunction with the implementation may be contained in at least one implementation of the disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

In the disclosure, a network refers to a public land mobile network (PLMN). A network terminal can be a mobile phone, a tablet computer, a computer, etc., and can be any carrier that requires computing power services or can provide computing power services. The network terminal has a unique identifier (ID), and the ID can be a sequence consisted of at least one of number, letter, and special character. A 3rd generation partnership project (3GPP) connection can be established between network terminals for data transmission. In implementations of the disclosure, the network terminals include a first network terminal, a second network terminal, and a third network terminal.

In related art, due to limited computing power of a single computing entity, a computing task with a huge computation amount is hard to be quickly completed. Therefore, a method for computing power sharing is provided in the disclosure, which can achieve computing power sharing, to quickly complete the computing task. Specifically, the method for computing power sharing provided in implementations of the disclosure is suitable for roaming of network terminals.

Specifically, in the related art, based on a roaming service access policy of the network terminal, there are two roaming manners: local breakout (LBO for short) roaming access manner and home routed roaming access manner.

The local breakout roaming access manner means that: a roaming user obtains a corresponding service by accessing a visit network, where a provider of the service is the visit network.

The home routed roaming access manner means that: the roaming user obtains a service provided by a home network by accessing the home network, where the provider of the service is the home network.

For example, a certain network terminal has a mobile phone number of Nanjing, if the network terminal in Hangzhou accesses a data network (DN) of a core network of Hangzhou, the roaming access manner is the LBO roaming access manner; if the network terminal in Nanjing accesses a DN of Nanjing, the roaming access manner is the home routed roaming access manner.

In implementations of the disclosure, the network includes a core network. In the core network, there is a new function for computing power sharing, that is, a computing power sharing function (CPSF), which belongs to the entity deployed by the operator and has computing power scheduling function. The CPSF is connected with the core network. Based on the network registration attribution relationship of the network terminal, the network can be a home public land mobile network (H-PLMN for short) or a visit public land mobile network (V-PLMN for short). Accordingly, the CPSF in the H-PLMN is a home computing power sharing function (H-CPSF), and the CPSF in the V-PLMN is a visit computing power sharing function (V-CPSF).

Figure 1B:
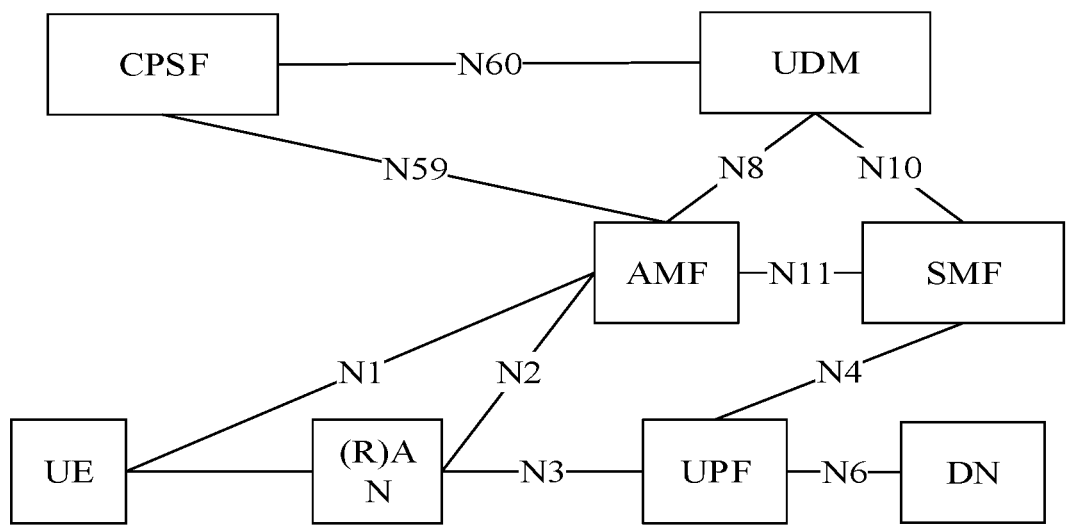

For connection between the CPSF and the core network, in a possible implementation, referring to FIG. 1A and FIG. 1B, FIG. 1A and FIG. 1B each are a schematic diagram of connections between a CPSF and reference points of a core network provided in implementations of the disclosure. In FIG. 1A, the CPSF is connected with the core network, for control plane transmission and data plane transmission. Specifically, the CPSF interacts with a unified data management (UDM) function via a newly added first reference point N60, and the CPSF interacts with an access and mobility management function (AMF) via a newly added second reference point N59, to achieve control plane transmission. In this case, the CPSF has a scheduling capability. The CPSF interacts with a user plane function (UPF) via a newly added third reference point N61, to achieve data plane transmission. That is, the CPSF can transmit large amount of data to other terminal devices, such as transmit a training model or training set, etc. In this case, the CPSF has an information integration capability.

In another possible implementation, referring to FIG. 1B, the CPSF is connected with the core network, for control plane transmission. Specifically, the CPSF interacts with the UDM function via the newly added first reference point N60, and the CPSF interacts with the AMF via the newly added second reference point N59, to achieve control plane transmission. In this case, the CPSF has a scheduling capability.

Similarly, the V-CPSF or the H-CPSF has the two connections illustrated in FIG. 1A and FIG. 1B.

In a possible implementation, the V-PLMN includes a visit core network. The V-CPSF interacts with a UDM function of the visit core network via the first reference point, the V-CPSF interacts with an AMF of the visit core network via the second reference point, and the V-CPSF interacts with a UPF of the visit core network via the third reference point.

In another possible implementation, the V-PLMN includes a visit core network. The V-CPSF interacts with the UDM function of the visit core network via the first reference point, and the V-CPSF interacts with the AMF of the visit core network via the second reference point.

In a possible implementation, the H-PLMN includes a home core network. The H-CPSF interacts with a UDM function of the home core network via the first reference point, the H-CPSF interacts with an AMF of the home core network via the second reference point, and the H-CPSF interacts with a UPF of the home core network via the third reference point.

In another possible implementation, the H-PLMN includes a home core network. The H-CPSF interacts with the UDM function of the home core network via the first reference point, and the H-CPSF interacts with the AMF of the home core network via the second reference point.

Implementations of the disclosure provide a method for computing power sharing. The method is applied to a V-CPSF. The V-CPSF is coupled with an H-CPSF. In a possible implementation, the H-CPSF interacts with the V-CPSF via a fourth reference point.

Figure 2A:
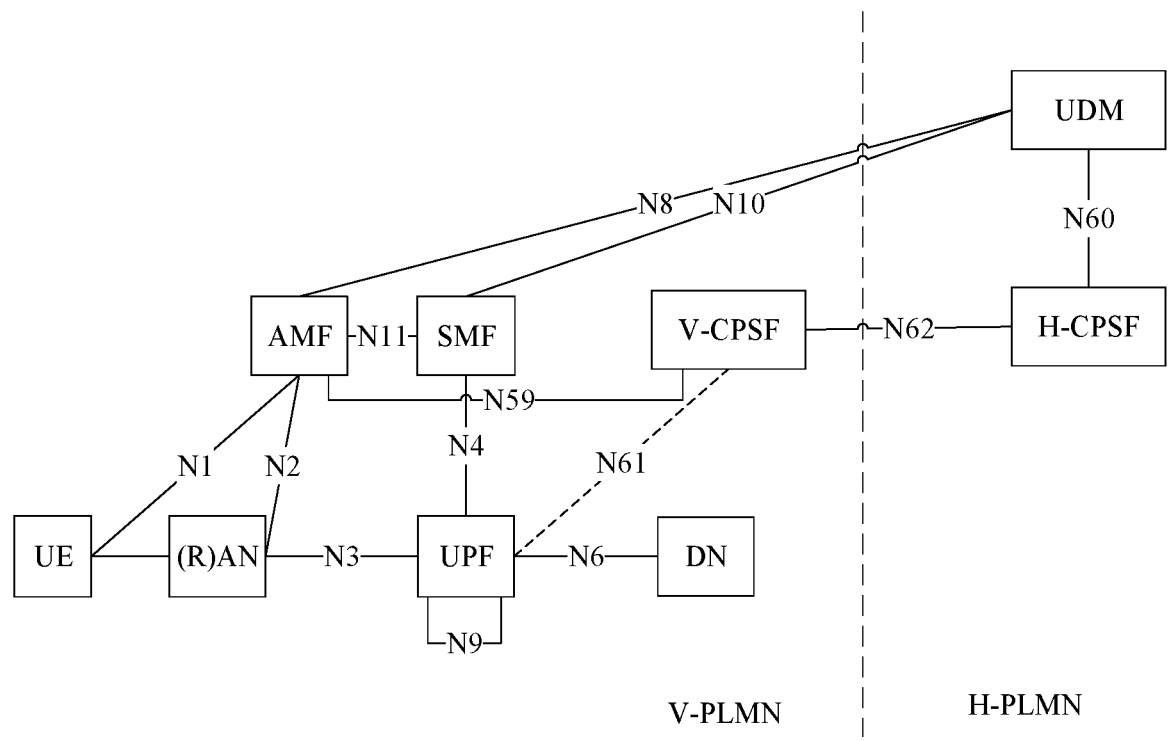
FIG. 2A and FIG. 2B each are a schematic diagram of a local breakout (LBO) roaming architecture of a method for computing power sharing provided in implementations of the disclosure.
Figure 2B:
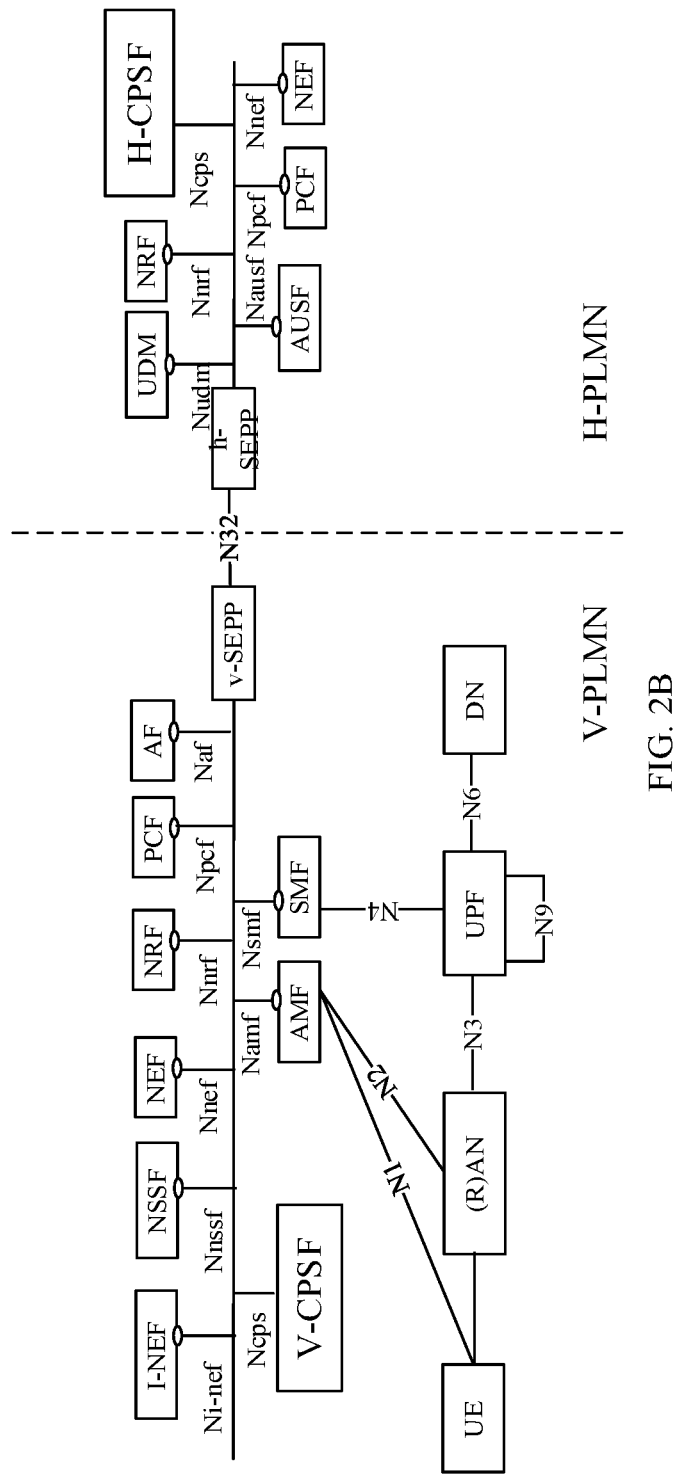

When a network terminal initiates computing power sharing authorization requests by using different roaming access manners, roaming architectures are also different. In a possible implementation, referring to FIG. 2A and FIG. 2B, FIG. 2A and FIG. 2B each are a schematic diagram of a LBO roaming architecture of a method for computing power sharing provided in implementations of the disclosure. For the LBO roaming access manner, a user equipment (UE) in FIG. 2A is the network terminal initiating the computing power sharing authorization request, a roaming reference point architecture of the method for computing power sharing is shown in FIG. 2A, and the corresponding service architecture is shown in FIG. 2B. In FIG. 2B, SEPP is a security edge protection proxy, which supports message filtering and policy management on a control plane interface between PLMNs. The SEPP is applied to each control plane signaling between PLMNs. The H-CPSF interacts with the V-CPSF via a fourth reference point N62. The third reference point N61 is illustrated in a dashed line, indicating that it is optional. When there is a third reference point N61, the V-CPSF can perform data plane transmission and control plane transmission, whereas when there is no third reference point N61, the V-CPSF can perform control plane transmission.

Figure 3A:
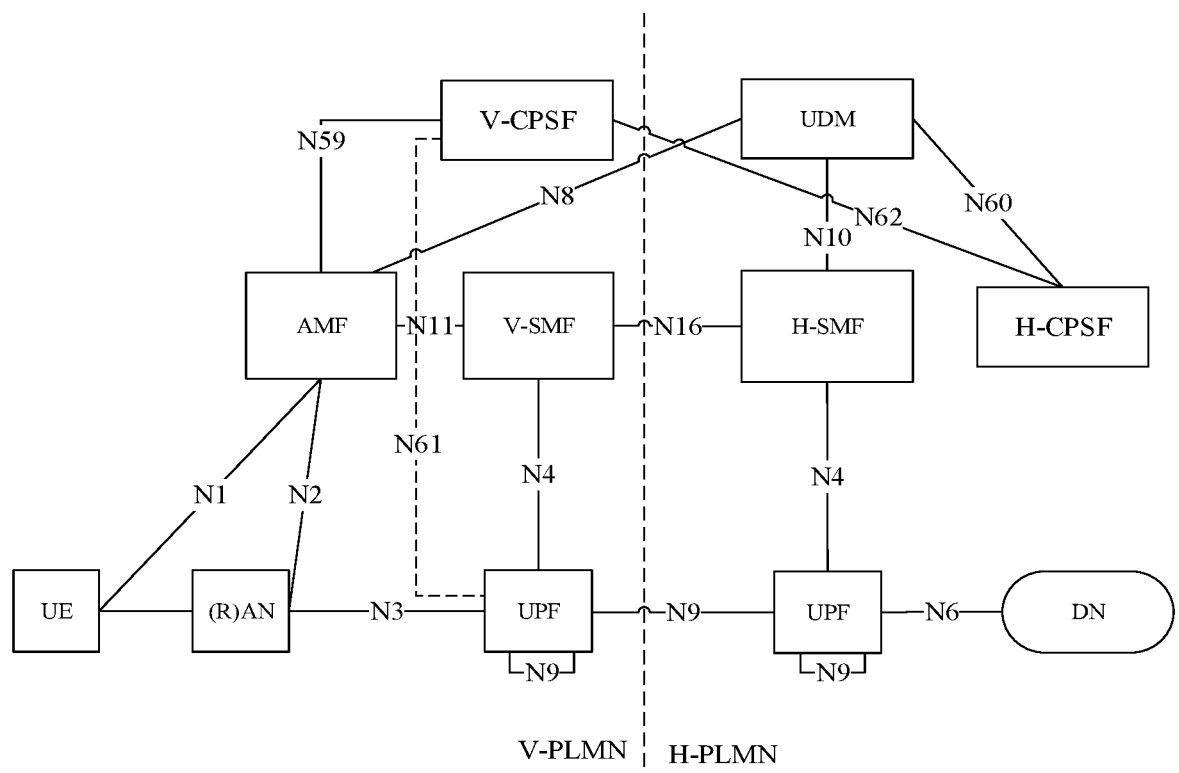
FIG. 3A and FIG. 3B each are a schematic diagram of a home routed roaming architecture of a method for computing power sharing provided in implementations of the disclosure.
Figure 3B:
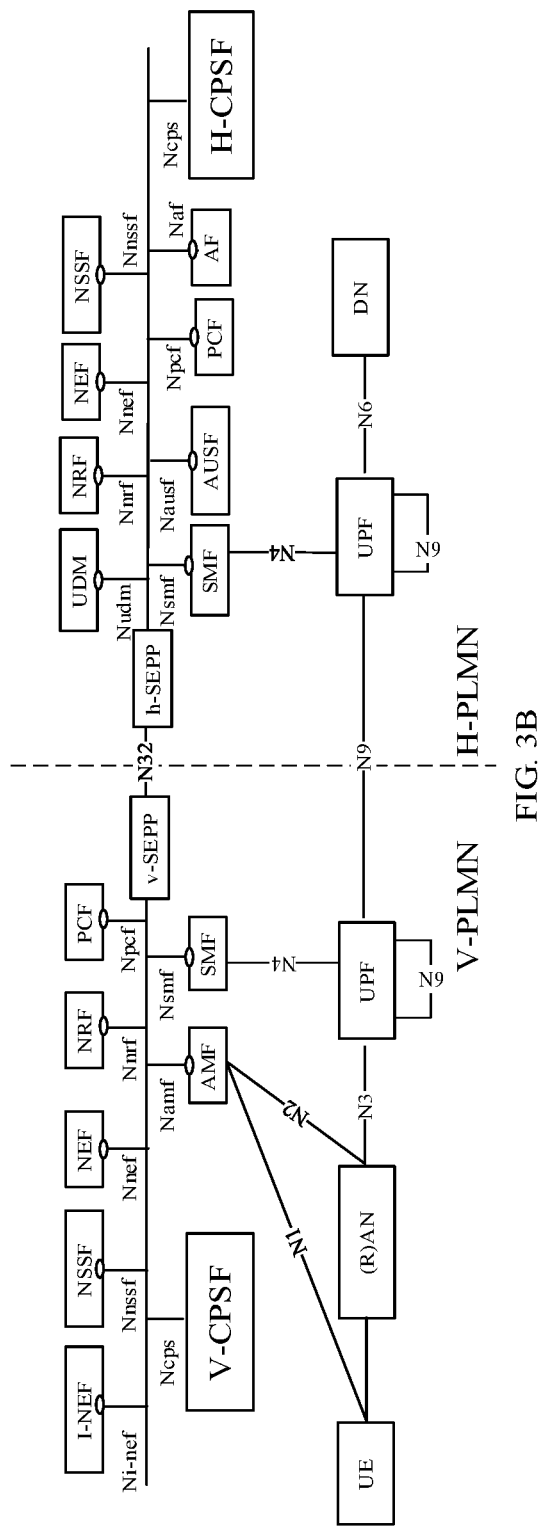

In a possible implementation, referring to FIG. 3A and FIG. 3B, FIG. 3A and FIG. 3B each are a schematic diagram of a home routed roaming architecture of a method for computing power sharing provided in implementations of the disclosure. For the home routed roaming access manner, a UE in FIG. 3A is the network terminal initiating the computing power sharing authorization request, a roaming reference point architecture of the method for computing power sharing is shown in FIG. 3A, and the corresponding service architecture is shown in FIG. 3B.

Figure 4A:
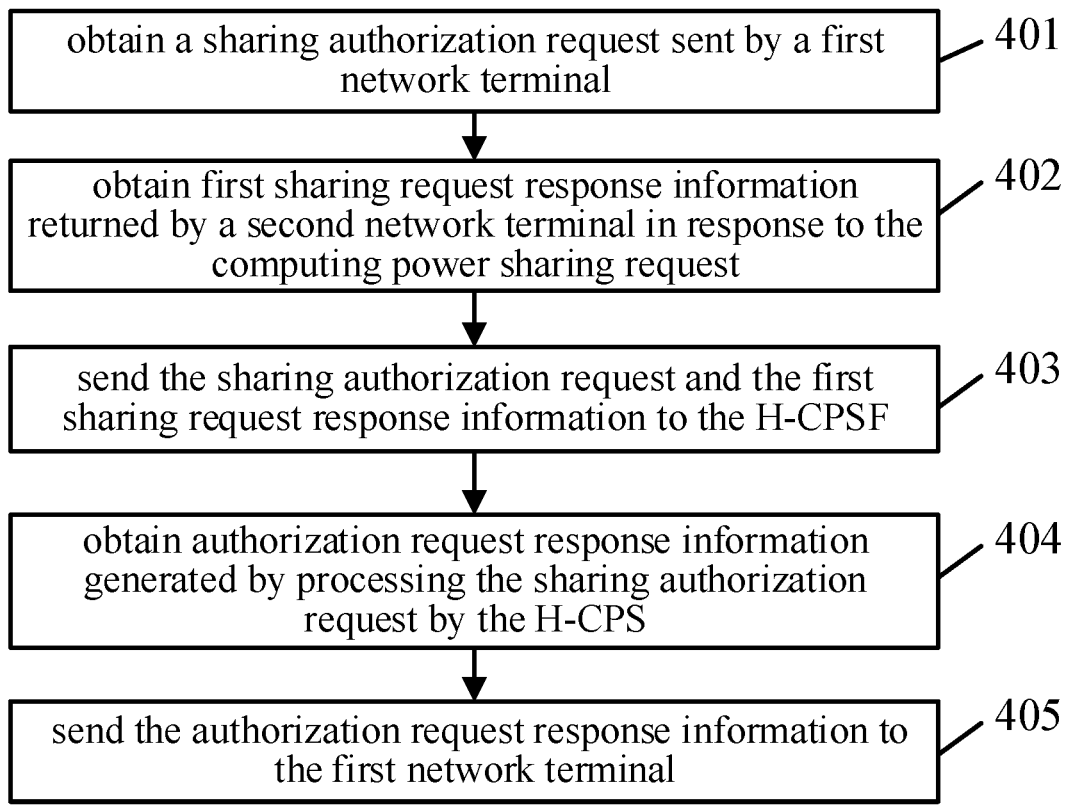
FIG. 4A and FIG. 4B each are a flow chart of a method for computing power sharing provided in implementations of the disclosure.
Figure 4B:
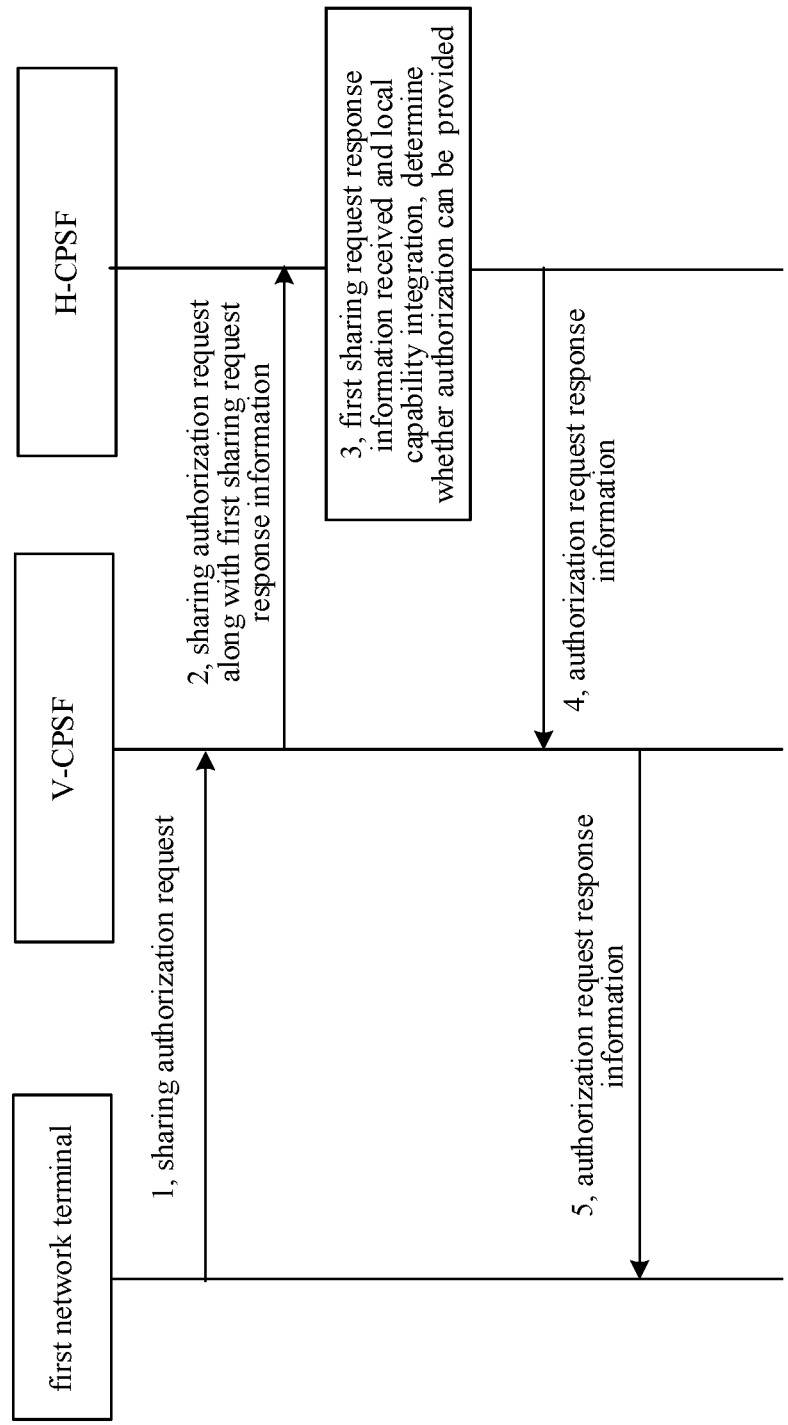

For the roaming architectures of the above two possible implementations, the method for computing power sharing of implementations of the disclosure can be adopted. The method is applied to V-CPSF. Referring to FIG. 4A and FIG. 4B, FIG. 4A and FIG. 4B each are a flow chart of a method for computing power sharing provided in implementations of the disclosure. The method includes the following.

401, obtain a sharing authorization request sent by a first network terminal, where the first network terminal is a roaming computing power demand terminal or a roaming computing power providing terminal, and the sharing authorization request carries a computing power sharing request.

Specifically, the triggering condition of requesting authorization of the CPSF by the first network terminal includes the following. For the first type, if the first network terminal does not have valid authorization information before starting computing power (demand/collaboration) initiation or communication, the first network terminal cannot initiate computing power sharing in this case, and needs to initiate an authorization request first. For the second type, the first network terminal has already performed computing power (demand/collaboration) initiation or communication, when the first network terminal changes the registered PLMN and there is no valid authorization information about the newly registered PLMN, it is necessary to re-initiate the authorization request for authorization application. For the third type, computing power sharing service authorization of the first network terminal has expired. For example, the first network terminal initiated a sharing authorization request and was authorized, where this authorization is limited to this computing power sharing. When this computing power sharing ends, this authorization expires. If the first network terminal wants to initiate computing power sharing again, it needs to re-apply for authorization.

The sharing authorization request is used to request from the V-CPSF, when the terminal roams, authorization for computing power sharing. When the sharing authorization for the first network terminal passes, the first network terminal can initiate computing power sharing. To speed up processing of computing power sharing, the sharing authorization request carries the computing power sharing request, where the computing power sharing request is for requesting computing power sharing calculation for a computing task of the first network terminal or requesting to let the first network terminal participate in computing power sharing calculation. That is, the computing power sharing request includes first computing power demand information of the first network terminal or first available computing power information of the first network terminal.

402, obtain first sharing request response information returned by a second network terminal in response to the computing power sharing request, where the second network terminal is a computing power demand terminal or a computing power providing terminal belonging to a visit public land mobile network (V-PLMN).

Specifically, the V-CPSF sends the computing power sharing request to the second network terminal belonging to the V-PLMN. The V-CPSF receives the first sharing request response information returned by the second network terminal in response to the computing power sharing request. The first sharing request response information includes second available computing power information of the second network terminal returned in response to the first computing power demand information or second computing power demand information of the second network terminal returned in response to the first available computing power information.

403, send the sharing authorization request and the first sharing request response information to the H-CPSF.

404, obtain authorization request response information generated by processing the sharing authorization request by the H-CPSF, where when the sharing authorization request passes, the authorization request response information includes a computing power sharing request response information generated by processing the computing power sharing request by the H-CPSF based on at least one of the first sharing request response information or second sharing request response information, and where the second sharing request response information is response information returned by a third network terminal in response to the computing power sharing request, and the third network terminal is a computing power demand terminal or a computing power providing terminal belonging to a home public land mobile network (H-PLMN).

Specifically, the H-CPSF processes the sharing authorization request to generate the authorization request response information. When authorization for the first network terminal fails, the authorization request response information includes authorization failure information. A first possibility of authorization failure is that: the first network terminal is an unauthorized terminal. That is, this first network terminal is not allowed to initiate computing power sharing. In this case, the H-CPSF does not process its computing power sharing request, and the H-CPSF directly returns the authorization failure information to the V-CPSF, and the V-CPSF sends the authorization failure information to the first network terminal. A second possibility is that: the first network terminal is an authorized terminal but its computing power sharing request cannot be met. In this case, the authorization also fails. In these cases, the authorization request response information also includes the computing power sharing request response information indicating that the computing power sharing request fails. When the computing power sharing request of the first network terminal can be met, the authorization succeeds in this case, and the authorization can be provided. The authorization request response information includes the authorization success information, and also includes the computing power sharing request response information indicating that the computing power sharing request succeeds.

Furthermore, specifically, when the sharing authorization request passes, the H-CPSF sends the computing power sharing request to the third network terminal belonging to the H-PLMN, and receives the second sharing request response information (i.e., the local capability of H-PLMN) returned by the third network terminal in response to the computing power sharing request. The second sharing request response information includes third available computing power information of the third network terminal returned in response to the first computing power demand information or third computing power demand information of the third network terminal returned in response to the first available computing power information. H-CPSF generates the computing power sharing request response information by processing the computing power sharing request based on at least one of the first sharing request response information or the second sharing request response information. When at least one of the first sharing request response information or the second sharing request response information can meet the computing power sharing request, the computing power sharing request response information includes computing power sharing success information. On the contrary, when both the first sharing request response information and the second sharing request response information cannot meet the computing power sharing request, the computing power sharing request response information includes computing power sharing failure information.

405, send the authorization request response information to the first network terminal.

Specifically, the V-CPSF receives the authorization request response information from the H-CPSF. For a first possibility, the authorization request response information can be the authorization failure information. For a second possibility, the authorization request response information includes the authorization failure information and the computing power sharing request response information indicating failure of the computing power sharing request. For a third possibility, the authorization request response information includes the authorization success information and the computing power sharing request response information indicating success of the computing power sharing request. The V-CPSF sends the authorization request response information to the first network terminal, such that the user of the first network terminal knows the authorization result of the sharing authorization request.

By adopting the above method for computing power sharing, when the first network terminal roams, the computing power sharing authorization processing can be completed, to further achieve computing power sharing and improve a computing speed of the sharing computing task.

In a possible implementation, the sharing authorization request further carries an ID of the first network terminal. In 404, obtaining the authorization request response information by generated processing the sharing authorization request by the H-CPSF includes the following.

4041, determine whether the first network terminal has matched computing power signing information by querying a computing power signed database of the H-PLMN based on the ID of the first network terminal, where the computing power signed database includes a correspondence between IDs of multiple first network terminals and computing power signing information, and the computing power signing information includes signing information of a computing power demander or signing information of a computing power provider.

Specifically, each network has one computing power signed database, and the computing power signed database stores the correspondence between the IDs of the multiple network terminals and their computing power signing information (or called computing power subscription information). For example, a certain network terminal wants to apply for calculating a model of a drone in the V-PLMN, the V-PLMN needs to check from the H-PLMN whether this network terminal has purchased the service of calculating this model, that is, to determine whether there is computing power signing information of the network terminal in the computing power signed database of the H-PLMN. Comparison can be performed in the computing power signed database based on the ID of the first network terminal. If computing power signing information matched with the ID is found, the first network terminal is an authorized terminal.

4042, determine that the authorization request response information includes authorization success information, based on a determination that the first network terminal has matched computing power signing information; determine that the authorization request response information includes authorization failure information, based on a determination that the first network terminal does not have matched computing power signing information.

Specifically, when the ID of the first network terminal is found in the computing power signed database, the specific computing power signing information of the first network terminal can be determined, and in this case the authorization request response information includes the authorization success information. On the contrary, if no computing power signing information is matched based on the ID of the first network terminal, the authorization request response information includes the authorization failure information.

By adopting the above method, whether the first network terminal is an authorized terminal can be quickly determined based on the ID of the first network terminal.

In a possible implementation, in 404, the H-CPSF generates the computing power sharing request response information by processing the computing power sharing request based on at least one of the first sharing request response information or the second sharing request response information as follows.

4043, the H-CPSF processes the computing power sharing request based on the first sharing request response information, and when the first sharing request response information can meet the computing power sharing request, generates the computing power sharing request response information based on the first sharing request response information and the computing power sharing request.

Specifically, the first sharing request response information returned by the second network terminal in the V-PLMN is preferentially used to process the computing power sharing request. When the first sharing request response information can meet the computing power sharing request of the first network terminal, generate the computing power sharing request response information directly based on the first sharing request response information and the computing power sharing request.

For example, if the computing power sharing request of the first network terminal includes the first computing power demand information of the first network terminal, the first sharing request response information includes second available computing power information of the second network terminal. When at least one second network terminal in the V-PLMN can meet the computing power demand determined based on the first computing power demand information of the first network terminal, perform computing power scheduling based on the first computing power demand information and at least one second available computing power information, and determine from the at least one second network terminal at least one second network terminal providing computing power assist for the first network terminal and a computing task and a computation amount of each second network terminal. Assuming that three second network terminals are finally determined to provide computing power assist for the first network terminal, the computing power sharing request response information in this case includes IDs of the above three second network terminals. It is noted that, in this case, during the computing power sharing, the first network terminal is a computing demand end, and the above three second network terminals are computing cooperation ends.

On the contrary, when the computing power sharing request of the first network terminal includes the first available computing power information of the first network terminal, after the computing scheduling is completed, it is determined that the first network terminal can provide assist for a certain second network terminal. In this case, the first network terminal is a computing cooperation end and this second network terminal is a computing demand end.

4044, when the first sharing request response information cannot meet the computing power sharing request, generate the computing power sharing request response information based on the first sharing request response information and the second sharing request response information.

Specifically, when the first sharing request response information cannot meet the computing power sharing request of the first network terminal, the computing power sharing request response information needs to be generated based on both the first sharing request response information at the V-PLMN and the second sharing request response information at H-PLMN. For example, the computing power sharing request includes the first computing power demand information of the first network terminal. Assuming that three second network terminals in the V-PLMN and two third network terminals in the H-PLMN needs to provide computing power assist for the first network terminal, the computing power sharing request response information includes IDs of the above three second network terminals and IDs of the above two third network terminals.

By adopting the above method, in processing the computing power sharing request, the second network terminal in the V-PLMN is preferentially selected to provide computing power assist for the first network terminal, and such local computing power sharing can effectively improve the computing efficiency of computing power sharing.

In a possible implementation, the above computing power demand information (for example, the first computing power demand information, the second computing power demand information, and the third computing power demand information) includes a computation amount required by the sharing computing task of the network terminal, where the sharing computing task is a processing object of computing power sharing. Furthermore, the computing power demand information further includes at least one of: effective time of the computing power demand information, acceptable longest computation time for completing the sharing computing task, a maximum task parallelism N (specifying that the sharing computing task can be assigned to up to N terminals for processing), an algorithm complexity of the sharing computing task, or a specified collected data type.

The effective time of the computing power demand information is configured to specify the effective time of the computing power demand information. For example, the effective time of the computing power demand information can be specified as a sending date of the computing power demand information, or the effective time of the computing power demand information can be directly specified as a specific time period. For example, the effective time of the first computing power demand information is specified to be valid from 12:00 to 17:00 on August 12, **** year. When the effective time of the first computing power demand information expires, the V-CPSF does not process the first computing power demand information (that is, does not process the computing power sharing request). Since the V-CPSF does not process the computing power sharing request, the authorization request response information in this case is the authorization failure information.

The specified collected data type is used to specify the data type that needs to be collected by the computing cooperation end during the calculation. Taking the model training scene as an example, if the specified collected data type is speed, the computing cooperation end needs to collect its own speed during calculation, to assist it complete the local training task.

In a possible implementation, the above available computing power information (for example, the first available computing power information, the second available computing power information, and the third available computing power information) includes a computation amount that can be provide by the network terminal, and the available computing power information can further include at least one of: effective time of the available computing power information, time required to provide the computation amount, a maximum task parallelism that can be accepted by the network terminal, or an algorithm complexity that can be handled by the network terminal.

Specifically, to stimulate computing power sharing, the computing power sharing request can further carry signing information such as cost for the first computing power demand information or cost of using the first available computing power information. The cost can be cash or computing power or other valuable rewards.

Furthermore, in processing the computing power sharing request, the H-CPSF determines whether the computing power sharing request can be met based on the specific information of the above computing power demand information and the specific information of the above available computing power information.

In a possible implementation, if at least one of the first sharing request response information or the second sharing request response information can meet the computing power sharing request, the computing power sharing request response information includes computing power sharing success information, and further includes computing power scheduling information. If the computing power sharing request of the first network terminal is the first computing power demand information, the computing power scheduling information includes the ID of the computing cooperation end. On the contrary, if the computing power sharing request is the first available computing power information, the computing power scheduling information includes the ID of the computing demand end.

Specifically, in processing the computing power sharing request, in addition to determining the computing demand end and the computing cooperation end, it is also necessary to determine an integration terminal for allocation and information integration of the sharing computing task during computing power sharing. The computing power scheduling information further includes the ID of the integration terminal. For the CPSF (such as the V-CPSF or the H-CPSF), when the CPSF performs data plane transmission with the core network, this CPSF has the capability of information integration. In implementations of the disclosure, to ensure the computing efficiency of computing power sharing, a priority order for selecting the integration terminal is the computing demand end, the V-CPSF, the H-CPSF, the computing cooperation end. The V-CPSF will also send the ID of the computing demand end and the ID of the computing cooperation end to the integration terminal, to achieve the subsequent computing power sharing.

For example, the computing power sharing request of the first network terminal is the first computing power demand information, if the sharing authorization request of the first network terminal passes, the authorization request response information includes the authorization success information, the ID of the computing cooperation end, and the ID of the integration terminal. The V-CPSF also sends the ID of the first network terminal and the ID of the computing cooperation end to the integration terminal. Specifically, when the computing power sharing begins, the first network terminal sends its sharing computing task to the integration terminal, and the integration terminal distributes the task based on the sharing computing task, sends the assigned task to the computing cooperation end, receives the processing result returned by the computing cooperation end, integrates all the processing results to obtain the total processing result of the sharing computing task, and then returns the total processing result to the first network terminal.

In a possible implementation, when the computing power sharing request includes the first computing power demand information of the first network terminal, and the first network terminal expects to participate in computing power sharing, the computing power sharing request includes participatory computing power information of the first network terminal.

Specifically, in addition to being the computing demand end, the first network terminal can be the computing cooperation end at the same time. The V-CPSF receives the participatory computing power information of the first network terminal and sends it to the H-CPSF. If the computing power sharing request of the first network terminal is the first computing power demand information, based on the participatory computing power information of the first network terminal, the first sharing request response information, and the second sharing request response information, the H-CPSF determines the terminal providing computing power assist for the first network terminal, i.e., determines the computing cooperation end.

In a possible implementation, the method further includes: when the computing power sharing request includes the first computing power demand information of the first network terminal, and a network terminal expects to participate in computing power sharing, returning participatory computing power information of the network terminal in response to the computing power sharing request, where the network terminal includes the second network terminal or the third network terminal.

Specifically, similarly, in addition to being the computing demand end, the second network terminal or the third network terminal can be the computing cooperation end.

In a possible implementation, the method further includes: when the V-CPSF expects to participate in computing power sharing, sending participatory computing power information of the V-CPSF to the H-CPSF, so that the computing power sharing request response information is generated by processing the computing power sharing request by the H-CPSF based on at least one of the participatory computing power information of the V-CPSF, the first sharing request response information, or the second sharing request response information.

Specifically, the V-CPSF can be the computing cooperation end, when determining the computing cooperation end in response to the computing power sharing request, the participatory computing power information of the V-CPSF needs to be considered.

In a possible implementation, when the H-CPSF expects to participate in computing power sharing, the computing power sharing request response information is generated by processing the computing power sharing request by the H-CPSF based on at least one of participatory computing power information of the H-CPSF, the first sharing request response information, or the second sharing request response information.

Specifically, the H-CPSF can be the computing cooperation end, when determining the computing cooperation end in response to the computing power sharing request, the participatory computing power information of the H-CPSF needs to be considered.

The above participatory computing power information includes the computation amount that can be provided by the network terminal, and the participatory computing power information can further include at least one of: time required to provide the computation amount, a maximum task parallelism that can be accepted, and an algorithm complexity that can be handled.

It is to be noted that, in determining the computing cooperation end during computing power sharing, besides the first sharing request response information and the second sharing request response information, there is a need to consider the participatory computing power information of the first network terminal, the participatory computing power information of the second network terminal, the participatory computing power information of the third network terminal, the participatory computing power information of the H-CPSF, and the participatory computing power information of the V-CPSF.

In a possible implementation, when the first network terminal expects to perform task allocation and information integration on a sharing computing task in computing power sharing, the computing power sharing request includes integration capability information of the first network terminal.

Specifically, in addition to being the computing demand end or the computing cooperation end, the first network terminal can be the integration terminal. Specifically, when the first network terminal is both the computing demand end and the integration terminal, during computing power sharing, the first network terminal is in charge of allocation and information integration of the sharing computing task, and thus sending the sharing computing task to the integration terminal can be omitted, which can improve processing efficiency of computing power sharing.

In a possible implementation, the method further includes: when the network terminal expects to perform task allocation and information integration on a sharing computing task in computing power sharing, returning integration capability information of the network terminal in response to the computing power sharing request, where the network terminal includes the second network terminal or the third network terminal.

Specifically, similarly, in addition to being the computing demand end or the computing cooperation end, the second network terminal or the third network terminal can be the integration terminal. Specifically, when the second network terminal or the third network terminal is both the computing demand end and the integration terminal, during computing power sharing, the second network terminal or the third network terminal is in charge of allocation and information integration of the sharing computing task, and thus sending the sharing computing task to the integration terminal can be omitted, which can improve processing efficiency of computing power sharing.

Therefore, when determining the integration terminal, the H-CPSF can determine the integration terminal in processing the computing demand of the computing demand end based on whether the computing demand end expects to be the integration terminal, whether the V-CPSF has the capability of information integration, whether the H-CPSF has the capability of information integration, and whether the computing cooperation end expects to be the integration terminal, that is, based on the above priority order for selecting the integration terminal.

For the method for computing power sharing of implementations of the disclosure, the computing power sharing problem of the first network terminal in the roaming scene can be solved. In the method of implementations of the disclosure, the network can no longer be used as a pipeline and has functions of scheduling, management, control, integration, and charging, etc.

Based on the description of the implementations of the method for computing power sharing, implementations of the disclosure further disclose a V-CPSF. The V-CPSF is coupled with an H-CPSF, where the CPSF is connected with a network for control plane transmission and data plane transmission, or the CPSF is connected with the network for control plane transmission.

Figure 5:
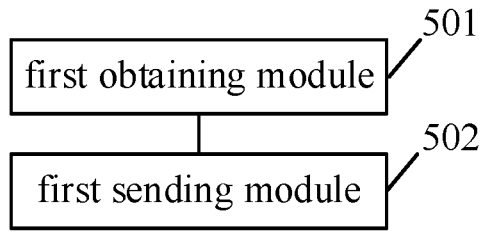
FIG. 5 is a structural schematic diagram of a visit computing power sharing function (V-CPSF) provided in implementations of the disclosure.

Referring to FIG. 5, FIG. 5 is a structural schematic diagram of a V-CPSF provided in implementations of the disclosure. The V-CPSF includes a first obtaining module 501 and a first sending module 502.

The first obtaining module 501 is configured to obtain a sharing authorization request sent by a first network terminal, where the first network terminal is a roaming computing power demand terminal or a roaming computing power providing terminal, and the sharing authorization request carries a computing power sharing request. The first obtaining module 501 is further configured to obtain first sharing request response information returned by a second network terminal in response to the computing power sharing request, where the second network terminal is a computing power demand terminal or a computing power providing terminal belonging to a V-PLMN. The first sending module 502 is configured to send the sharing authorization request and the first sharing request response information to the H-CPSF. The first obtaining module 501 is further configured to obtain authorization request response information generated by processing the sharing authorization request by the H-CPSF, where when the sharing authorization request passes, the authorization request response information includes a computing power sharing request response information generated by processing the computing power sharing request by the H-CPSF based on at least one of the first sharing request response information or second sharing request response information, and where the second sharing request response information is response information returned by a third network terminal in response to the computing power sharing request, and the third network terminal is a computing power demand terminal or a computing power providing terminal belonging to an H-PLMN. The first sending module 502 is further configured to send the authorization request response information to the first network terminal.

In a possible implementation, the computing power sharing request includes first computing power demand information or first available computing power information of the first network terminal. The first sharing request response information includes second available computing power information returned in response to the first computing power demand information or second computing power demand information returned in response to the first available computing power information. The second sharing request response information includes third available computing power information returned in response to the first computing power demand information or third computing power demand information returned in response to the first available computing power information.

In a possible implementation, the computing power demand information includes a computation amount required by a sharing computing task. The computing power demand information further includes at least one of: effective time of the computing power demand information, acceptable longest computation time for completing the sharing computing task, a maximum task parallelism, an algorithm complexity of the sharing computing task, or a specified collected data type.

In a possible implementation, the available computing power information includes a computation amount that can be provided by a network terminal. The available computing power information further includes at least one of: effective time of the available computing power information, time required to provide the computation amount, a maximum task parallelism, or an algorithm complexity that can be handled.

In a possible implementation, when the V-CPSF expects to participate in computing power sharing, the first sending module is further configured to send participatory computing power information of the V-CPSF to the H-CPSF, so that the computing power sharing request response information is generated by processing the computing power sharing request by the H-CPSF based on at least one of the participatory computing power information of the V-CPSF, the first sharing request response information, or the second sharing request response information.

It is noted that, for implementation manners of specific functions of the V-CPSF, reference can be made to the above description of the method for computing sharing, which is not repeated herein. Each unit or module in the V-CPSF may be combined separately or entirely into one or several other units or modules, or a unit(s) or module(s) of each unit or module may be further split into multiple functionally smaller units or modules, which may implement the same operation without affecting the implementation of the technical effects of the implementations of the application. The above units or modules are divided based on logical functions. In practical applications, functions of a unit (or module) can also be implemented by multiple units (or modules), or functions of multiple units (or modules) can be implemented by one unit (or module).

Based on the description of the method for computing power sharing of the above implementations, implementations of the disclosure further disclose a method for computing power sharing. The method is applied to the V-CPSF.

Referring to FIG. 2A, FIG. 2B, FIG. 3A, and FIG. 3B, the V-CPSF is connected with the H-CPSF, where the CPSF is connected with a network for control plane transmission and data plane transmission, or the CPSF is connected with the network for control plane transmission.

Figure 6:
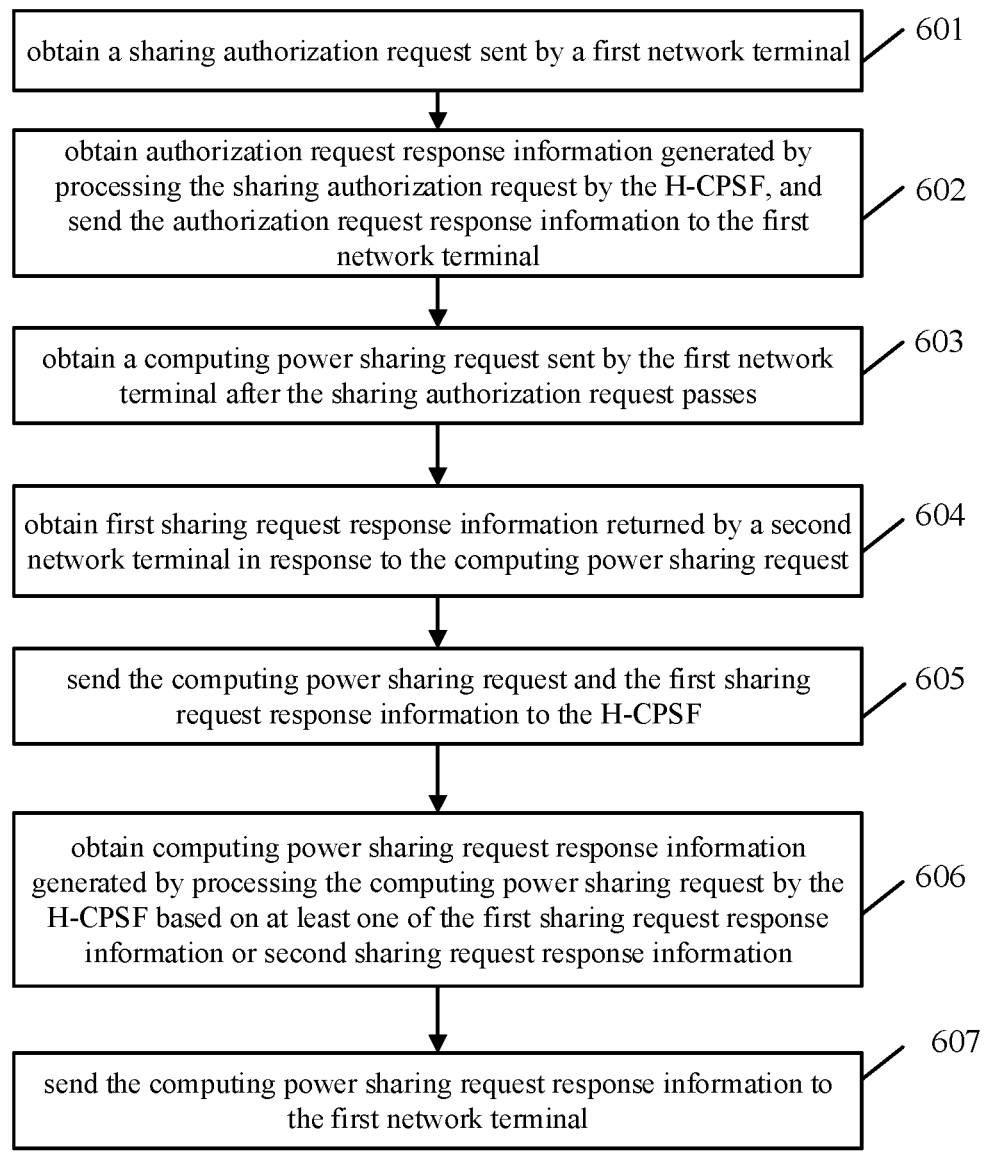
FIG. 6 is a flow chart of a method for computing power sharing provided in implementations of the disclosure.

For the roaming architecture illustrated in each of FIG. 2A, FIG. 2B, FIG. 3A, and FIG. 3B, the method for computing power sharing of implementations of the disclosure is applicable. Referring to FIG. 6, FIG. 6 is a flow chart of a method for computing power sharing provided in implementations of the disclosure. The method includes the following.

601, obtain a sharing authorization request sent by a first network terminal, where the first network terminal is a roaming computing power demand terminal or a roaming computing power providing terminal.

Specifically, the V-CPSF receives the sharing authorization request from the first network terminal.

602, obtain authorization request response information generated by processing the sharing authorization request by the H-CPSF, and send the authorization request response information to the first network terminal.

Specifically, the V-CPSF sends the sharing authorization request to the H-CPSF, to request the H-CPSF to process the sharing authorization request to generate the authorization request response information. The V-CPSF receives the authorization request response information from the H-CPSF, to send the authorization request response information to the first network terminal. When the authorization fails, the authorization request response information includes authorization failure information; when the authorization succeeds, the authorization request response information includes authorization success information.

603, obtain a computing power sharing request sent by the first network terminal after the sharing authorization request passes.

Specifically, if the authorization request response information includes the authorization success information, the first network terminal sends the computing power sharing request to the V-CPSF. The V-CPSF receives the computing power sharing request sent by the first network terminal after the sharing authorization request passes.

604, obtain first sharing request response information returned by a second network terminal in response to the computing power sharing request, where the second network terminal is a computing power demand terminal or a computing power providing terminal belonging to a V-PLMN.

605, send the computing power sharing request and the first sharing request response information to the H-CPSF.

606, obtain computing power sharing request response information generated by processing the computing power sharing request by the H-CPSF based on at least one of the first sharing request response information or second sharing request response information, where the second sharing request response information is response information returned by a third network terminal in response to the computing power sharing request, and the third network terminal is a computing power demand terminal or a computing power providing terminal belonging to an H-PLMN.

607, send the computing power sharing request response information to the first network terminal.

By adopting the above method, when the first network terminal roams, the computing power sharing authorization processing can be completed, to further achieve computing power sharing and improve a computing speed of the sharing computing task.

The difference between the method for computing power sharing of implementations of the disclosure and the above method implementations is that: the sharing authorization request and the computing power sharing request are requested respectively. For the detailed description of implementations of the disclosure, reference can be made to the description of the above method implementations, which is not repeated herein.

Based on the description of the implementations of the method for computing power sharing, implementations of the disclosure further disclose a V-CPSF.

The V-CPSF is coupled with an H-CPSF. The CPSF is connected with a network for control plane transmission and data plane transmission, or the CPSF is connected with the network for control plane transmission.

Figure 7:
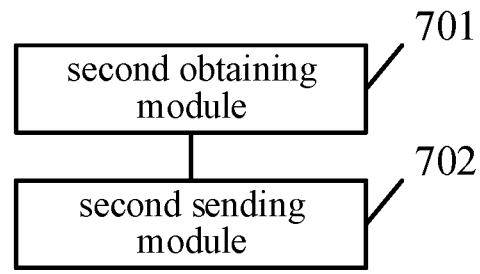
FIG. 7 is a structural schematic diagram of a V-CPSF provided in implementations of the disclosure.

Referring to FIG. 7, FIG. 7 is a structural schematic diagram of a V-CPSF provided in implementations of the disclosure. The V-CPSF includes a second obtaining module 701 and a second sending module 702.

The second obtaining module 701 is configured to obtain a sharing authorization request sent by a first network terminal, where the first network terminal is a roaming computing power demand terminal or a roaming computing power providing terminal. The second obtaining module 701 is further configured to obtain authorization request response information generated by processing the sharing authorization request by the H-CPSF, and send the authorization request response information to the first network terminal. The second obtaining module 701 is further configured to obtain a computing power sharing request sent by the first network terminal after the sharing authorization request passes. The second obtaining module 701 is further configured to obtain first sharing request response information returned by a second network terminal in response to the computing power sharing request, where the second network terminal is a computing power demand terminal or a computing power providing terminal belonging to a V-PLMN. The second sending module 702 is configured to send the computing power sharing request and the first sharing request response information to the H-CPSF. The second obtaining module 701 is further configured to obtain computing power sharing request response information generated by processing the computing power sharing request by the H-CPSF based on at least one of the first sharing request response information or second sharing request response information, where the second sharing request response information is response information returned by a third network terminal in response to the computing power sharing request, and the third network terminal is a computing power demand terminal or a computing power providing terminal belonging to an H-PLMN. The second sending module 702 is further configured to send the computing power sharing request response information to the first network terminal.

It is noted that, for implementation manners of specific functions of the V-CPSF, reference can be made to the above description of the method for computing sharing, which is not repeated herein. Each unit or module in the V-CPSF may be combined separately or entirely into one or several other units or modules, or a unit(s) or module(s) of each unit or module may be further split into multiple functionally smaller units or modules, which may implement the same operation without affecting the implementation of the technical effects of the implementations of the application. The above units or modules are divided based on logical functions. In practical applications, functions of a unit (or module) can also be implemented by multiple units (or modules), or functions of multiple units (or modules) can be implemented by one unit (or module).

Implementations of the disclosure further provide a method for computing power sharing. The method is applied to an H-CPSF. The H-CPSF is coupled with a V-CPSF and connected with a first network terminal, where the CPSF is connected with a network for control plane transmission and data plane transmission, or the CPSF is connected with the network for control plane transmission.

Figure 8:
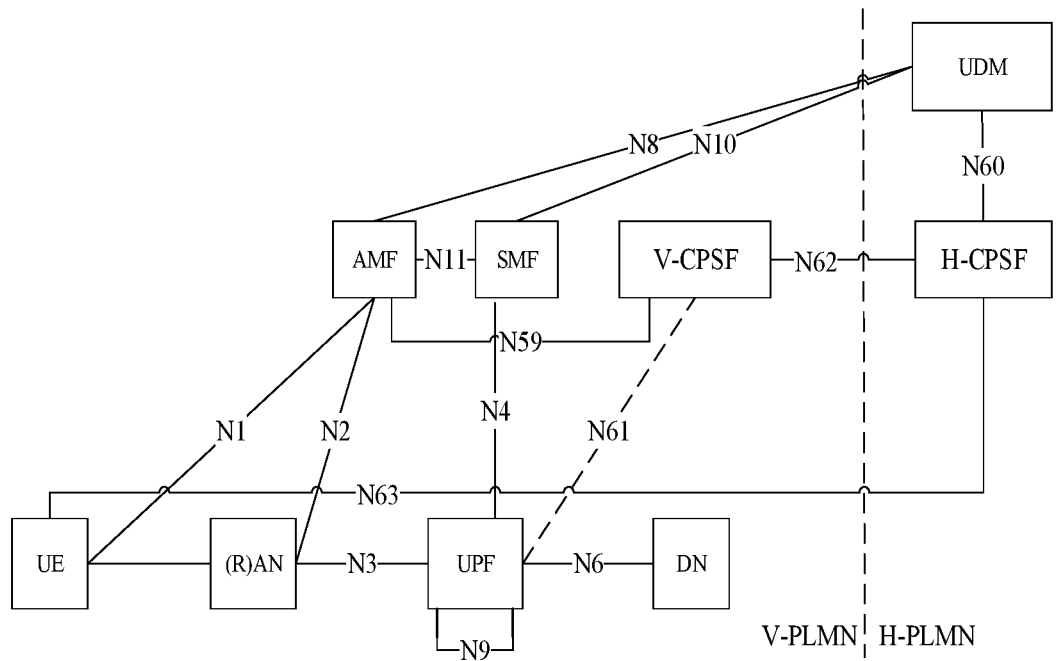
FIG. 8 is a schematic diagram of a LBO roaming architecture of a method for computing power sharing provided in implementations of the disclosure.

In a possible implementation, referring to FIG. 8, FIG. 8 is a schematic diagram of a LBO roaming architecture of a method for computing power sharing provided in implementations of the disclosure. In the LBO roaming access manner, the UE in FIG. 8 is the first network terminal, where the H-CPSF interacts with the V-CPSF via the fourth reference point N62, and the first network terminal interacts with the H-CPSF via a fifth reference point N63.

Figure 9:
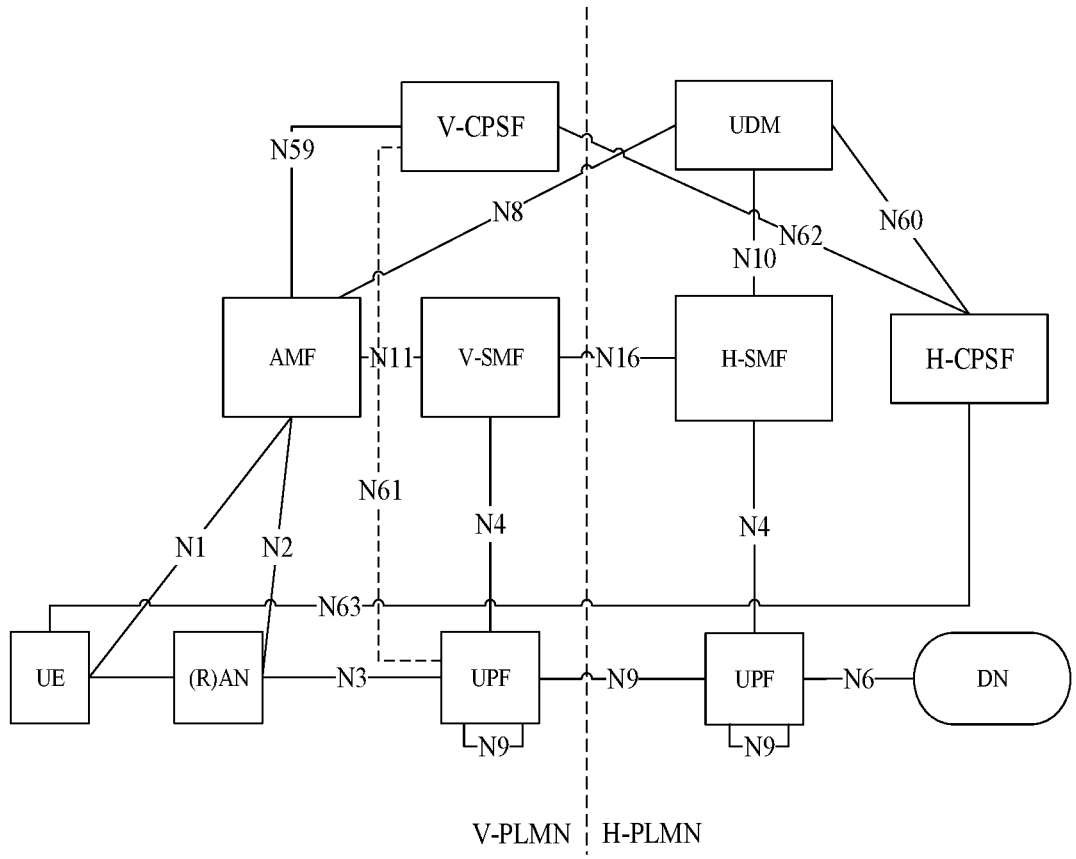
FIG. 9 is a schematic diagram of a home routed roaming architecture of a method for computing power sharing provided in implementations of the disclosure.

In another possible implementation, referring to FIG. 9, FIG. 9 is a schematic diagram of a home routed roaming architecture of a method for computing power sharing provided in implementations of the disclosure. In the home routed roaming access manner, the UE in FIG. 9 is the first network terminal, where the H-CPSF interacts with the V-CPSF via the fourth reference point N62, and the first network terminal interacts with the H-CPSF via the fifth reference point N63.

Figure 10A:
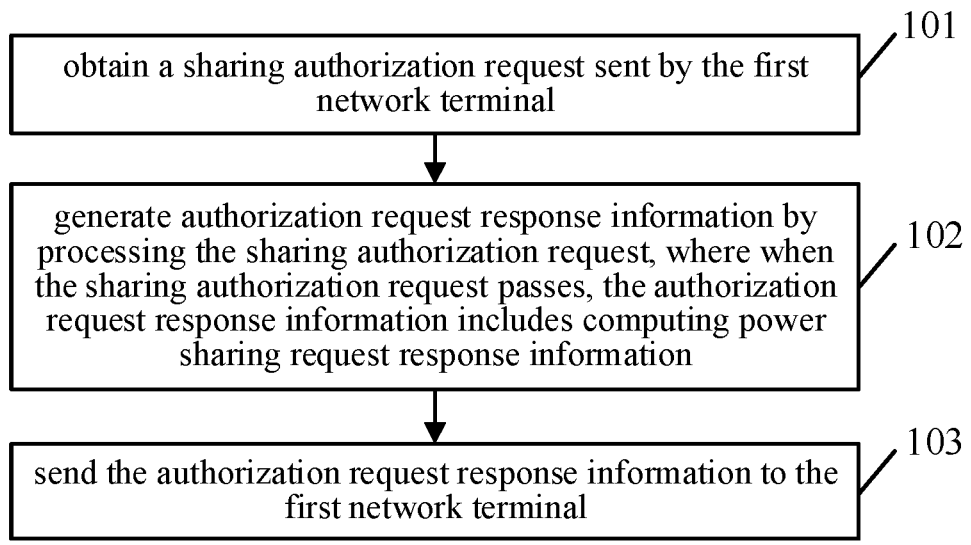
FIG. 10A and FIG. 10B each are a flow chart of a method for computing power sharing provided in implementations of the disclosure.
Figure 10B:
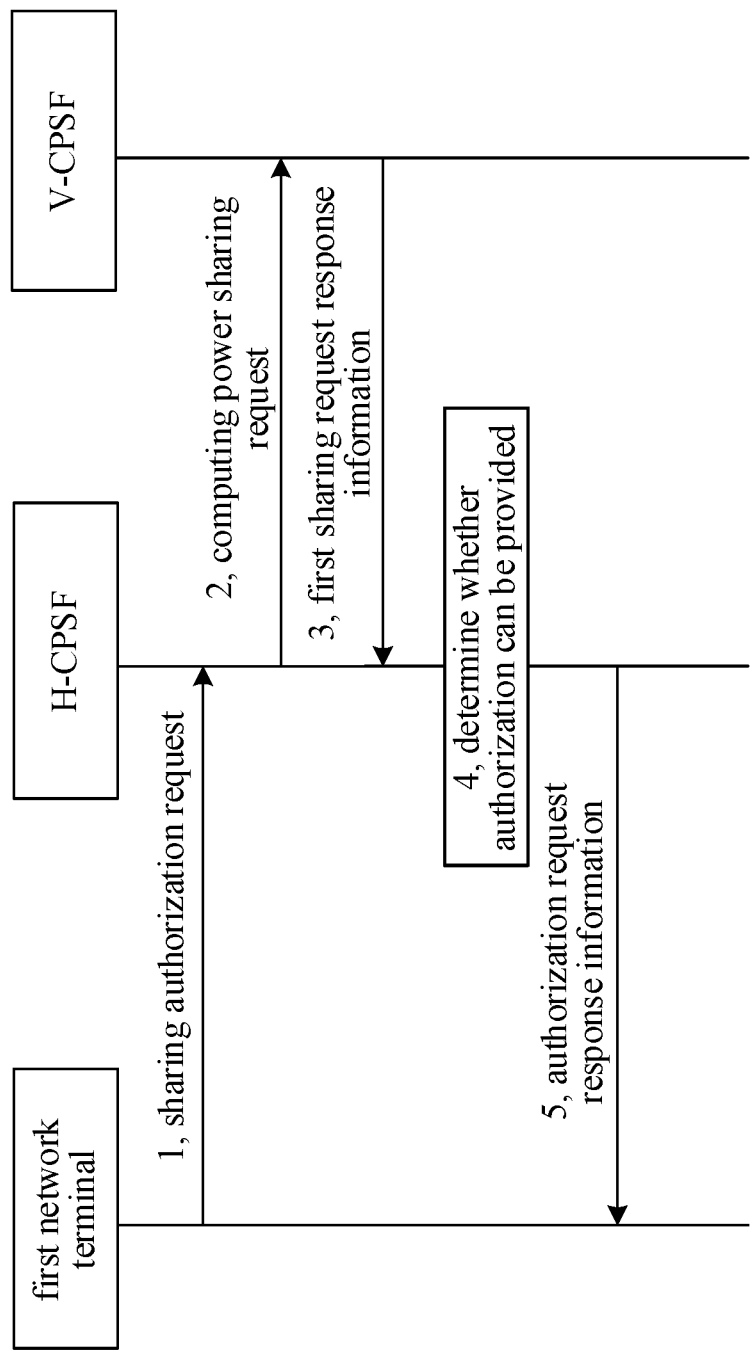

Specifically, referring to FIG. 10A and FIG. 10B, FIG. 10A and FIG. 10B each are a flow chart of a method for computing power sharing provided in implementations of the disclosure. The method includes the following.

101, obtain a sharing authorization request sent by the first network terminal, where the first network terminal is a roaming computing power demand terminal or a roaming computing power providing terminal, and the sharing authorization request carries a computing power sharing request.

102, generate authorization request response information by processing the sharing authorization request, where when the sharing authorization request passes, the authorization request response information includes computing power sharing request response information generated by processing the computing power sharing request based on at least one of first sharing request response information and second sharing request response information, where the H-CPSF obtains the first sharing request response information sent by the V-CPSF, the first sharing request response information is response information returned by a second network terminal to the V-CPSF in response to the computing power sharing request, and the second network terminal is a computing power demand terminal or a computing power providing terminal belonging to a V-PLMN, and where the second sharing request response information is response information returned by a third network terminal in response to the computing power sharing request, and the third network terminal is a computing power demand terminal or a computing power providing terminal belonging to an H-PLMN.

Specifically, if the H-CPSF determines that the first network terminal is an unauthorized terminal, the authorization request response information includes the authorization failure information, the H-CPSF does not process the computing power sharing request of the first network terminal, and the H-CPSF directly sends the authorization failure information to the first network terminal.

If the H-CPSF determines that the first network terminal is an authorized terminal, the H-CPSF processes the computing power sharing request of the first network terminal. In this case, the first sharing request response information is obtained and then the second sharing request response information is obtained. Alternatively, the second sharing request response information is obtained and then the first sharing request response information is obtained. Then, the H-CPSF generates the computing power sharing request response information by processing the computing power sharing request based on at least one of the first sharing request response information or the second sharing request response information.

103, send the authorization request response information to the first network terminal.

By adopting the above method, when the first network terminal roams, the computing power sharing authorization processing can be completed, to further achieve computing power sharing and improve a computing speed of the sharing computing task.

In a possible implementation, the computing power sharing request includes first computing power demand information or first available computing power information of the first network terminal. The first sharing request response information includes second available computing power information returned in response to the first computing power demand information or second computing power demand information returned in response to the first available computing power information. The second sharing request response information includes third available computing power information returned in response to the first computing power demand information or third computing power demand information returned in response to the first available computing power information.

In a possible implementation, the computing power demand information includes a computation amount required by a sharing computing task. The computing power demand information further includes at least one of: effective time of the computing power demand information, acceptable longest computation time for completing the sharing computing task, a maximum task parallelism, an algorithm complexity of the sharing computing task, or a specified collected data type.

In a possible implementation, the available computing power information includes a computation amount that can be provided by a network terminal. The available computing power information further includes at least one of: effective time of the available computing power information, time required to provide the computation amount, a maximum task parallelism, or an algorithm complexity that can be handled.

In a possible implementation, the sharing authorization request further carries an ID of the first network terminal. Obtaining the authorization request response information generated by processing the sharing authorization request by the H-CPSF includes: determining whether the first network terminal has matched computing power signing information by querying a computing power signed database of the H-PLMN based on the ID of the first network terminal, where the computing power signed database includes a correspondence between IDs of multiple first network terminals and computing power signing information, and the computing power signing information includes signing information of a computing power demander or signing information of a computing power provider, where the authorization request response information includes authorization success information, based on a determination that the first network terminal has matched computing power signing information; and the authorization request response information includes authorization failure information, based on a determination that the first network terminal does not have matched computing power signing information.

In a possible implementation, generating the computing power sharing request response information by processing the computing power sharing request based on at least one of the first sharing request response information or the second sharing request response information includes the following. The H-CPSF processes the computing power sharing request based on the first sharing request response information. When the first sharing request response information can meet the computing power sharing request, generate the computing power sharing request response information based on the first sharing request response information and the computing power sharing request. When the first sharing request response information cannot meet the computing power sharing request, generate the computing power sharing request response information based on the first sharing request response information and the second sharing request response information.

In a possible implementation, the method further includes: when the computing power sharing request includes the first computing power demand information of the first network terminal, and when a network terminal expects to participate in computing power sharing, returning participatory computing power information of the network terminal in response to the computing power sharing request; or when the network terminal expects to perform task allocation and information integration on a sharing computing task in computing power sharing, returning integration capability information of the network terminal in response to the computing power sharing request, where the network terminal includes the second network terminal or the third network terminal.

In a possible implementation, when the computing power sharing request includes the first computing power demand information of the first network terminal, and when the first network terminal expects to participate in computing power sharing, the computing power sharing request includes participatory computing power information of the first network terminal; or when the first network terminal expects to perform task allocation and information integration on a sharing computing task in computing power sharing, the computing power sharing request includes integration capability information of the first network terminal.

In a possible implementation, the method further includes: when the V-CPSF expects to participate in computing power sharing, sending participatory computing power information of the V-CPSF to the H-CPSF, so that the computing power sharing request response information is generated by processing the computing power sharing request by the H-CPSF based on at least one of the participatory computing power information of the V-CPSF, the first sharing request response information, or the second sharing request response information; or when the H-CPSF expects to participate in computing power sharing, the computing power sharing request response information is generated by processing the computing power sharing request by the H-CPSF based on at least one of participatory computing power information of the H-CPSF, the first sharing request response information, or the second sharing request response information.

In a possible implementation, the network includes a visit core network. The V-CPSF interacts with a UDM function of the visit core network through a first reference point, the V-CPSF interacts with a AMF of the visit core network through a second reference point, and the V-CPSF interacts with a UPF of the visit core network through a third reference point; or the V-CPSF interacts with the UDM function of the visit core network through the first reference point, and the V-CPSF interacts with the AMF of the visit core network through the second reference point.

In a possible implementation, the network includes a home core network. The H-CPSF interacts with a UDM function of the home core network through a first reference point, the H-CPSF interacts with a AMF of the home core network through a second reference point, and the H-CPSF interacts with a UPF of the home core network through a third reference point; or the H-CPSF interacts with the UDM function of the home core network through the first reference point, and the H-CPSF interacts with the AMF of the home core network through the second reference point.

For the specific description of the method of implementations of the disclosure, reference can be made to the above description of the method for computing power sharing, which will not be repeated in detail.

Based on the description of the implementations of the method for computing power sharing, implementations of the disclosure further disclose an H-CPSF.

The H-CPSF is coupled with a V-CPSF and connected with a first network terminal, where the CPSF is connected with a network for control plane transmission and data plane transmission, or the CPSF is connected with the network for control plane transmission.

Figure 11:
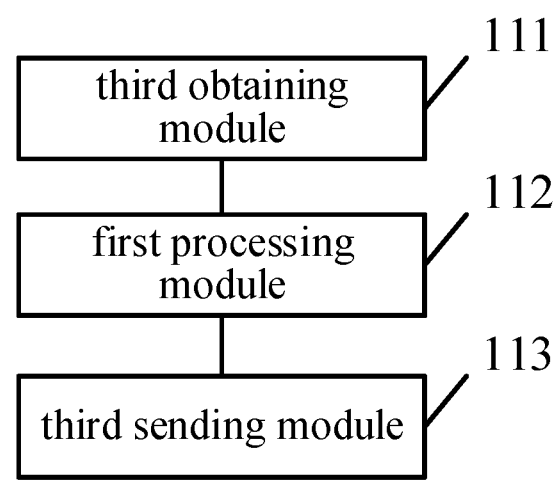
FIG. 11 is a structural schematic diagram of a home computing power sharing function (H-CPSF) provided in implementations of the disclosure.

Referring to FIG. 11, FIG. 11 is a structural schematic diagram of an H-CPSF provided in implementations of the disclosure. The H-CPSF includes a third obtaining module 111, a first processing module 112, and a third sending module 113.

The third obtaining module 111 is configured to obtain a sharing authorization request sent by the first network terminal, where the first network terminal is a roaming computing power demand terminal or a roaming computing power providing terminal, and the sharing authorization request carries a computing power sharing request. The first processing module 112 is configured to generate authorization request response information by processing the sharing authorization request, where when the sharing authorization request passes, the authorization request response information includes computing power sharing request response information generated by processing the computing power sharing request based on at least one of first sharing request response information and second sharing request response information, where the H-CPSF obtains the first sharing request response information sent by the V-CPSF, the first sharing request response information is response information returned by a second network terminal to the V-CPSF in response to the computing power sharing request, and the second network terminal is a computing power demand terminal or a computing power providing terminal belonging to a V-PLMN, and where the second sharing request response information is response information returned by a third network terminal in response to the computing power sharing request, and the third network terminal is a computing power demand terminal or a computing power providing terminal belonging to an H-PLMN. The third sending module 113 is configured to send the authorization request response information to the first network terminal.

It is noted that, for implementation manners of specific functions of the H-CPSF, reference can be made to the above description of the method for computing sharing, which is not repeated herein. Each unit or module in the H-CPSF may be combined separately or entirely into one or several other units or modules, or a unit(s) or module(s) of each unit or module may be further split into multiple functionally smaller units or modules, which may implement the same operation without affecting the implementation of the technical effects of the implementations of the application. The above units or modules are divided based on logical functions. In practical applications, functions of a unit (or module) can also be implemented by multiple units (or modules), or functions of multiple units (or modules) can be implemented by one unit (or module).

Based on the description of the implementations of the above method for computing power sharing, implementations of the disclosure further provide a method for computing power sharing. The method is applied to an H-CPSF.

The H-CPSF is coupled with a V-CPSF and connected with a first network terminal, where the CPSF is connected with a network for control plane transmission and data plane transmission, or the CPSF is connected with the network for control plane transmission.

Figure 12:
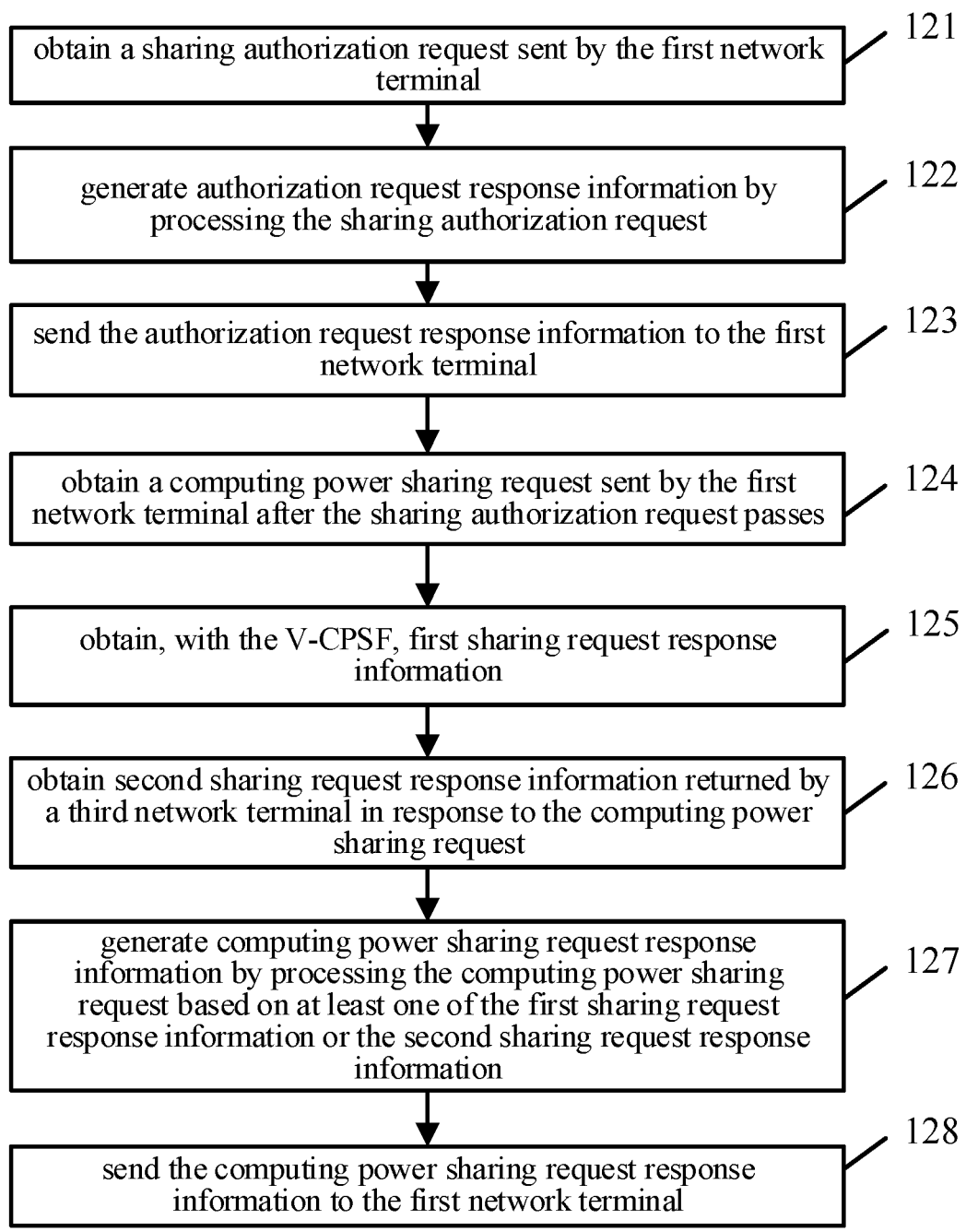
FIG. 12 is a flow chart of a method for computing power sharing provided in implementations of the disclosure.

Referring to FIG. 12, FIG. 12 is a flow chart of a method for computing power sharing provided in implementations of the disclosure. The method includes the following.

121, obtain a sharing authorization request sent by the first network terminal, where the first network terminal is a roaming computing power demand terminal or a roaming computing power providing terminal.

122, generate authorization request response information by processing the sharing authorization request.

123, send the authorization request response information to the first network terminal.

124, obtain a computing power sharing request sent by the first network terminal after the sharing authorization request passes.

125, obtain, with the V-CPSF, first sharing request response information returned by a second network terminal in response to the computing power sharing request, where the second network terminal is a computing power demand terminal or a computing power providing terminal belonging to a V-PLMN.

126, obtain second sharing request response information returned by a third network terminal in response to the computing power sharing request, where the third network terminal is a computing power demand terminal or a computing power providing terminal belonging to an H-PLMN.

The order of execution of 125 and 126 is not particularly limited. 125 may be performed before 126; or 126 may be performed before 125.

127, generate computing power sharing request response information by processing the computing power sharing request based on at least one of the first sharing request response information or the second sharing request response information.

128, send the computing power sharing request response information to the first network terminal.

By adopting the above method, when the first network terminal roams, the computing power sharing authorization processing can be completed, to further achieve computing power sharing and improve a computing speed of the sharing computing task.

The difference between the method for computing power sharing of implementations of the disclosure and the above method implementations is that: the sharing authorization request and the computing power sharing request are requested respectively. For the detailed description of implementations of the disclosure, reference can be made to the description of the above method implementations, which is not repeated herein.

Based on the description of the implementations of the above method for computing power sharing, implementations of the disclosure further provide an H-CPSF.

The H-CPSF is coupled with a V-CPSF and connected with a first network terminal, where the CPSF is connected with a network for control plane transmission and data plane transmission, or the CPSF is connected with the network for control plane transmission.

Figure 13:
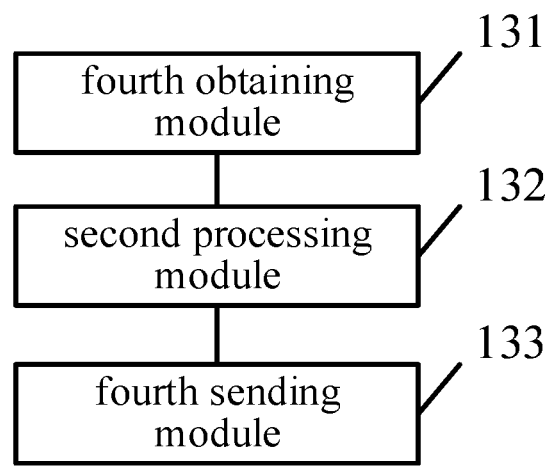
FIG. 13 is a structural schematic diagram of an H-CPSF provided in implementations of the disclosure.
Figure 14:
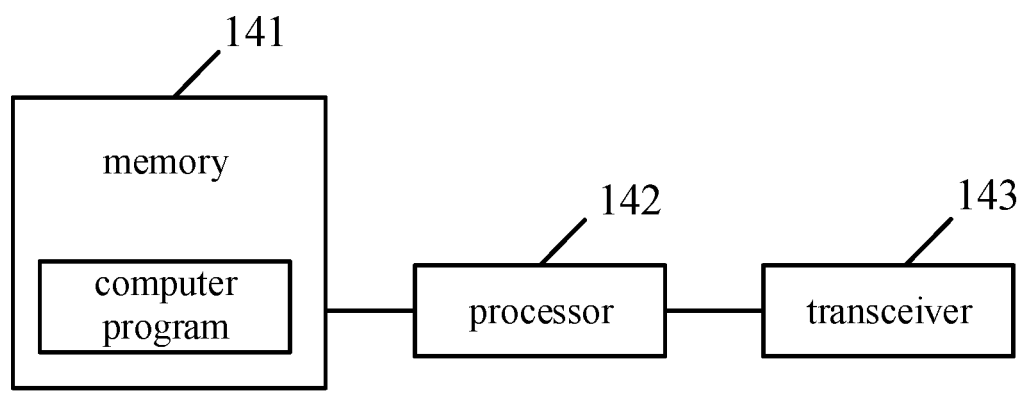
FIG. 14 is a structural schematic diagram of a CPSF provided in implementations of the disclosure.

Referring to FIG. 13, FIG. 13 is a structural schematic diagram of an H-CPSF provided in implementations of the disclosure. The H-CPSF includes a fourth obtaining module 131, a second processing module 132, and a fourth sending module 133.

The fourth obtaining module 131 is configured to obtain a sharing authorization request sent by the first network terminal, where the first network terminal is a roaming computing power demand terminal or a roaming computing power providing terminal. The second processing module 132 is configured to generate authorization request response information by processing the sharing authorization request. The fourth sending module 133 is configured to send the authorization request response information to the first network terminal. The fourth obtaining module 131 is further configured to obtain a computing power sharing request sent by the first network terminal after the sharing authorization request passes. The fourth obtaining module 131 is further configured to obtain, with the V-CPSF, first sharing request response information returned by a second network terminal in response to the computing power sharing request, where the second network terminal is a computing power demand terminal or a computing power providing terminal belonging to a V-PLMN. The fourth obtaining module 131 is further configured to obtain second sharing request response information returned by a third network terminal in response to the computing power sharing request, where the third network terminal is a computing power demand terminal or a computing power providing terminal belonging to an H-PLMN. The second processing module 132 is further configured to generate computing power sharing request response information by processing the computing power sharing request based on at least one of the first sharing request response information or the second sharing request response information. The fourth sending module 133 is further configured to send the computing power sharing request response information to the first network terminal.

It is noted that, for implementation manners of specific functions of the H-CPSF, reference can be made to the above description of the method for computing sharing, which is not repeated herein. Each unit or module in the H-CPSF may be combined separately or entirely into one or several other units or modules, or a unit(s) or module(s) of each unit or module may be further split into multiple functionally smaller units or modules, which may implement the same operation without affecting the implementation of the technical effects of the implementations of the application. The above units or modules are divided based on logical functions. In practical applications, functions of a unit (or module) can also be implemented by multiple units (or modules), or functions of multiple units (or modules) can be implemented by one unit (or module).

Based on the description of the above method implementations, a CPSF is further provided in implementations of the disclosure. The CPSF includes a transceiver 143, a processor 142, a memory 141, and computer programs stored in the memory 141 and executed by the processor. The processor 142 coupled with the transceiver 143 and the memory 141 respectively is configured to execute the computer programs to implement the method for computing power sharing.

The transceiver 143 may include a transceiver antenna, a network card, or various physical results with information transmitting and receiving functions. The memory 141 may include storage devices with various storage media. The processor 142 may be a central processor, a microprocessor, a digital signal processor, an application processor, a programmable array, an application specific integrated circuit (ASIC), or various processing devices. The processor 142 can be coupled with the transceiver 143 and the memory 141 through an integrated circuit bus. The processor 142 can execute the computer programs to implement the foregoing method for computing power sharing. It can be understood that, the CPSF illustrated in implementations of the disclosure can perform the above method for computing power sharing, which is not repeated herein. In addition, description of an advantageous effect with the same method is also not repeated.

In addition, it should be noted herein that, a non-transitory computer storage medium is further provided in implementations of the disclosure. The non-transitory computer storage medium is configured to store the above computer programs executed by the H-CPSF, or V-CPSF, or CPSF, and the computer programs include program instructions which, when executed by a processor, are operable with the processor to perform the foregoing description of the method for computing power sharing, which will not be repeated herein. In addition, description of an advantageous effect with the same method is also not repeated. For technical details undisclosed in the implementations of the non-transitory computer storage medium involved in the disclosure, reference can be made to the description of the method implementations of the disclosure.

It will be understood by those of ordinary skill in the art that all or a part of the various methods of the implementations described above may be accomplished by means of computer programs to instruct associated hardware, and the programs may be stored in a computer-readable storage medium, and the programs when executed, may include the process of the implementations of the above various methods. The storage medium may include a magnetic disk, an optical disk, a read-only memory (ROM), a random access memory (RAM), etc.

In conclusion, Implementations of the disclosure provide a method for computing power sharing and related devices, which can achieve computing power sharing and improve a computation speed effectively.

Implementations of the disclosure provide a method for computing power sharing. The method is applied to a visit computing power sharing function (V-CPSF) coupled with a home computing power sharing function (H-CPSF). The V-CPSF and the H-CPSF are each a computing power sharing function (CPSF) and the CPSF is connected with a network for control plane transmission and data plane transmission, or the CPSF is connected with the network for control plane transmission.

The method includes: obtaining a sharing authorization request sent by a first network terminal, where the first network terminal is a roaming computing power demand terminal or a roaming computing power providing terminal, and the sharing authorization request carries a computing power sharing request; obtaining first sharing request response information returned by a second network terminal in response to the computing power sharing request, where the second network terminal is a computing power demand terminal or a computing power providing terminal belonging to a visit public land mobile network (V-PLMN); sending the sharing authorization request and the first sharing request response information to the H-CPSF; obtaining authorization request response information generated by processing the sharing authorization request by the H-CPSF, where when the sharing authorization request passes, the authorization request response information includes a computing power sharing request response information generated by processing the computing power sharing request by the H-CPSF based on at least one of the first sharing request response information or second sharing request response information, and where the second sharing request response information is response information returned by a third network terminal in response to the computing power sharing request, and the third network terminal is a computing power demand terminal or a computing power providing terminal belonging to a home public land mobile network (H-PLMN); and sending the authorization request response information to the first network terminal.

In implementations of the disclosure, the method for computing power sharing is applied to the V-CPSF. Specifically, the V-CPSF obtains the sharing authorization request sent by the first network terminal, where the sharing authorization request carries the computing power sharing request. The V-CPSF then obtains the first sharing request response information returned by the second network terminal belonging to the V-PLMN in response to the computing power sharing request. The V-CPSF sends the sharing authorization request and the first sharing request response information to the H-CPSF, and obtains authorization request response information generated by processing the sharing authorization request by the H-CPSF, where when the sharing authorization request passes, the authorization request response information includes the computing power sharing request response information generated by processing the computing power sharing request by the H-CPSF based on at least one of the first sharing request response information or the second sharing request response information, and where the second sharing request response information is the response information returned by the third network terminal belonging to the H-PLMN in response to the computing power sharing request. The V-CPSF sends the authorization request response information to the first network terminal. As can be seen, when the first network terminal roams, based on the above method, the computing power sharing authorization processing can be completed, to further achieve computing power sharing and improve a computing speed of the sharing computing task.

Optionally, the computing power sharing request includes first computing power demand information or first available computing power information of the first network terminal. The first sharing request response information includes second available computing power information returned in response to the first computing power demand information or second computing power demand information returned in response to the first available computing power information. The second sharing request response information includes third available computing power information returned in response to the first computing power demand information or third computing power demand information returned in response to the first available computing power information.

Optionally, the computing power demand information includes a computation amount required by a sharing computing task or the available computing power information includes a computation amount that can be provided by a network terminal.

Optionally, the computing power demand information further includes at least one of: effective time of the computing power demand information, acceptable longest computation time for completing the sharing computing task, a maximum task parallelism, an algorithm complexity of the sharing computing task, or a specified collected data type; or the available computing power information further includes at least one of: effective time of the available computing power information, time required to provide the computation amount, a maximum task parallelism, or an algorithm complexity that can be handled.

Optionally, the sharing authorization request further carries an identifier (ID) of the first network terminal. Obtaining the authorization request response information generated by processing the sharing authorization request by the H-CPSF includes: determining whether the first network terminal has matched computing power signing information by querying a computing power signed database of the H-PLMN based on the ID of the first network terminal, where the computing power signed database includes a correspondence between IDs of multiple first network terminals and computing power signing information, and the computing power signing information includes signing information of a computing power demander or signing information of a computing power provider, where the authorization request response information includes authorization success information, based on a determination that the first network terminal has matched computing power signing information; and the authorization request response information includes authorization failure information, based on a determination that the first network terminal does not have matched computing power signing information.

Optionally, when the computing power sharing request includes the first computing power demand information of the first network terminal and a network terminal expects to participate in computing power sharing, returning participatory computing power information of the network terminal in response to the computing power sharing request; or when the network terminal expects to perform task allocation and information integration on a sharing computing task in computing power sharing, returning integration capability information of the network terminal in response to the computing power sharing request, where the network terminal is the second network terminal or the third network terminal.

Optionally, when the computing power sharing request includes the first computing power demand information of the first network terminal and the first network terminal expects to participate in computing power sharing, the computing power sharing request includes participatory computing power information of the first network terminal; or when the first network terminal expects to perform task allocation and information integration on a sharing computing task in computing power sharing, the computing power sharing request includes integration capability information of the first network terminal.

Optionally, the method further includes: when the V-CPSF expects to participate in computing power sharing, sending participatory computing power information of the V-CPSF to the H-CPSF, so that the computing power sharing request response information is generated by processing the computing power sharing request by the H-CPSF based on at least one of the participatory computing power information of the V-CPSF, the first sharing request response information, or the second sharing request response information; or when the H-CPSF expects to participate in computing power sharing, the computing power sharing request response information is generated by processing the computing power sharing request by the H-CPSF based on at least one of participatory computing power information of the H-CPSF, the first sharing request response information, or the second sharing request response information.

Optionally, the network includes a core network. The CPSF interacts with a unified data management (UDM) function of the core network through a first reference point, the CPSF interacts with an access and mobility management function (AMF) of the core network through a second reference point, and the CPSF interacts with a user plane function (UPF) of the core network through a third reference point; or the CPSF interacts with the UDM function of the core network through the first reference point, and the CPSF interacts with the AMF of the core network through the second reference point.

Optionally, the H-CPSF interacts with the V-CPSF through a fourth reference point.

Implementations of the disclosure further provide a V-CPSF, coupled with an H-CPSF, where the CPSF is connected with a network for control plane transmission and data plane transmission, or the CPSF is connected with the network for control plane transmission.

The V-CPSF includes a first obtaining module and a first sending module. The first obtaining module is configured to obtain a sharing authorization request sent by a first network terminal, where the first network terminal is a roaming computing power demand terminal or a roaming computing power providing terminal, and the sharing authorization request carries a computing power sharing request. The first obtaining module is further configured to obtain first sharing request response information returned by a second network terminal in response to the computing power sharing request, where the second network terminal is a computing power demand terminal or a computing power providing terminal belonging to a V-PLMN. The first sending module is configured to send the sharing authorization request and the first sharing request response information to the H-CPSF. The first obtaining module is further configured to obtain authorization request response information generated by processing the sharing authorization request by the H-CPSF, where when the sharing authorization request passes, the authorization request response information includes a computing power sharing request response information generated by processing the computing power sharing request by the H-CPSF based on at least one of the first sharing request response information or second sharing request response information, and where the second sharing request response information is response information returned by a third network terminal in response to the computing power sharing request, and the third network terminal is a computing power demand terminal or a computing power providing terminal belonging to an H-PLMN. The first sending module is further configured to send the authorization request response information to the first network terminal.

Implementations of the disclosure further provide a method for computing power sharing. The method is applied to a V-CPSF coupled with an H-CPSF. The CPSF is connected with a network for control plane transmission and data plane transmission, or the CPSF is connected with the network for control plane transmission.

The method includes: obtaining a sharing authorization request sent by a first network terminal, where the first network terminal is a roaming computing power demand terminal or a roaming computing power providing terminal; obtaining authorization request response information generated by processing the sharing authorization request by the H-CPSF, and sending the authorization request response information to the first network terminal; obtaining a computing power sharing request sent by the first network terminal after the sharing authorization request passes; obtaining first sharing request response information returned by a second network terminal in response to the computing power sharing request, where the second network terminal is a computing power demand terminal or a computing power providing terminal belonging to a V-PLMN; sending the computing power sharing request and the first sharing request response information to the H-CPSF; obtaining computing power sharing request response information generated by processing the computing power sharing request by the H-CPSF based on at least one of the first sharing request response information or second sharing request response information, where the second sharing request response information is response information returned by a third network terminal in response to the computing power sharing request, and the third network terminal is a computing power demand terminal or a computing power providing terminal belonging to an H-PLMN; and sending the computing power sharing request response information to the first network terminal.

In implementations of the disclosure, when the first network terminal roams, by adopting the above method, the computing power sharing authorization processing can be completed, to further achieve computing power sharing and improve a computing speed of the sharing computing task.

Implementations of the disclosure further provide a V-CPSF coupled with an H-CPSF. The CPSF is connected with a network for control plane transmission and data plane transmission, or the CPSF is connected with the network for control plane transmission.

The V-CPSF includes a second obtaining module and a second sending module. The second obtaining module is configured to obtain a sharing authorization request sent by a first network terminal, where the first network terminal is a roaming computing power demand terminal or a roaming computing power providing terminal. The second obtaining module is further configured to obtain authorization request response information generated by processing the sharing authorization request by the H-CPSF, and send the authorization request response information to the first network terminal. The second obtaining module is further configured to obtain a computing power sharing request sent by the first network terminal after the sharing authorization request passes. The second obtaining module is further configured to obtain first sharing request response information returned by a second network terminal in response to the computing power sharing request, where the second network terminal is a computing power demand terminal or a computing power providing terminal belonging to a V-PLMN. The second sending module is configured to send the computing power sharing request and the first sharing request response information to the H-CPSF. The second obtaining module is further configured to obtain computing power sharing request response information generated by processing the computing power sharing request by the H-CPSF based on at least one of the first sharing request response information or second sharing request response information, where the second sharing request response information is response information returned by a third network terminal in response to the computing power sharing request, and the third network terminal is a computing power demand terminal or a computing power providing terminal belonging to an H-PLMN. The second sending module is further configured to send the computing power sharing request response information to the first network terminal.

Implementations of the disclosure further provide a method for computing power sharing. The method is applied to an H-CPSF. The H-CPSF is coupled with a V-CPSF and connected with a first network terminal, where the CPSF is connected with a network for control plane transmission and data plane transmission, or the CPSF is connected with the network for control plane transmission.

The method includes: obtaining a sharing authorization request sent by the first network terminal, where the first network terminal is a roaming computing power demand terminal or a roaming computing power providing terminal, and the sharing authorization request carries a computing power sharing request; generating authorization request response information by processing the sharing authorization request, where when the sharing authorization request passes, the authorization request response information includes computing power sharing request response information generated by processing the computing power sharing request based on at least one of first sharing request response information and second sharing request response information, where the H-CPSF obtains the first sharing request response information sent by the V-CPSF, the first sharing request response information is response information returned by a second network terminal to the V-CPSF in response to the computing power sharing request, and the second network terminal is a computing power demand terminal or a computing power providing terminal belonging to a V-PLMN, and where the second sharing request response information is response information returned by a third network terminal in response to the computing power sharing request, and the third network terminal is a computing power demand terminal or a computing power providing terminal belonging to an H-PLMN; and sending the authorization request response information to the first network terminal.

In implementations of the disclosure, the method for computing power sharing is applied to the H-CPSF. Specifically, the H-CPSF obtains the sharing authorization request sent by the first network terminal, where the sharing authorization request carries the computing power sharing request. The H-CPSF generates the authorization request response information by processing the sharing authorization request, where when the sharing authorization request passes, the authorization request response information includes the computing power sharing request response information generated by processing the computing power sharing request based on at least one of the first sharing request response information and the second sharing request response information, where the first sharing request response information is the response information returned by the second network terminal belonging to the V-PLMN to the V-CPSF in response to the computing power sharing request, and the second sharing request response information is the response information returned by the third network terminal belonging to the H-PLMN in response to the computing power sharing request. The H-CPSF sends the authorization request response information to the first network terminal. As can be seen, when the first network terminal roams, based on the above method, the computing power sharing authorization processing can be completed, to further achieve computing power sharing and improve a computing speed of the sharing computing task.

Optionally, the H-CPSF interacts with the V-CPSF through a fourth reference point and the H-CPSF interacts with the first network terminal through a fifth reference point.

Implementations of the disclosure further provide an H-CPSF. The H-CPSF is coupled with a V-CPSF and connected with a first network terminal, where the CPSF is connected with a network for control plane transmission and data plane transmission, or the CPSF is connected with the network for control plane transmission.

The H-CPSF includes a third obtaining module, a first processing module, and a third sending module. The third obtaining module is configured to obtain a sharing authorization request sent by the first network terminal, where the first network terminal is a roaming computing power demand terminal or a roaming computing power providing terminal, and the sharing authorization request carries a computing power sharing request. The first processing module is configured to generate authorization request response information by processing the sharing authorization request, where when the sharing authorization request passes, the authorization request response information includes computing power sharing request response information generated by processing the computing power sharing request based on at least one of first sharing request response information and second sharing request response information, where the H-CPSF obtains the first sharing request response information sent by the V-CPSF, the first sharing request response information is response information returned by a second network terminal to the V-CPSF in response to the computing power sharing request, and the second network terminal is a computing power demand terminal or a computing power providing terminal belonging to a V-PLMN, and where the second sharing request response information is response information returned by a third network terminal in response to the computing power sharing request, and the third network terminal is a computing power demand terminal or a computing power providing terminal belonging to an H-PLMN. The third sending module is configured to send the authorization request response information to the first network terminal.

Implementations of the disclosure further provide a method for computing power sharing. The method is applied to an H-CPSF. The H-CPSF is coupled with a V-CPSF and connected with a first network terminal, where the CPSF is connected with a network for control plane transmission and data plane transmission, or the CPSF is connected with the network for control plane transmission.

The method includes: obtaining a sharing authorization request sent by the first network terminal, where the first network terminal is a roaming computing power demand terminal or a roaming computing power providing terminal; generating authorization request response information by processing the sharing authorization request; sending the authorization request response information to the first network terminal; obtaining a computing power sharing request sent by the first network terminal after the sharing authorization request passes; obtaining, with the V-CPSF, first sharing request response information returned by a second network terminal in response to the computing power sharing request, where the second network terminal is a computing power demand terminal or a computing power providing terminal belonging to a V-PLMN; obtaining second sharing request response information returned by a third network terminal in response to the computing power sharing request, where the third network terminal is a computing power demand terminal or a computing power providing terminal belonging to an H-PLMN; generating computing power sharing request response information by processing the computing power sharing request based on at least one of the first sharing request response information or the second sharing request response information; and sending the computing power sharing request response information to the first network terminal.

In implementations of the disclosure, when the first network terminal roams, by adopting the above method, the computing power sharing authorization processing can be completed, to further achieve computing power sharing and improve a computing speed of the sharing computing task.

Implementations of the disclosure further provide an H-CPSF. The H-CPSF is coupled with a V-CPSF and connected with a first network terminal, where the CPSF is connected with a network for control plane transmission and data plane transmission, or the CPSF is connected with the network for control plane transmission.

The H-CPSF includes a fourth obtaining module, a second processing module, and a fourth sending module. The fourth obtaining module is configured to obtain a sharing authorization request sent by the first network terminal, where the first network terminal is a roaming computing power demand terminal or a roaming computing power providing terminal. The second processing module is configured to generate authorization request response information by processing the sharing authorization request. The fourth sending module is configured to send the authorization request response information to the first network terminal. The fourth obtaining module is further configured to obtain a computing power sharing request sent by the first network terminal after the sharing authorization request passes. The fourth obtaining module is further configured to obtain, with the V-CPSF, first sharing request response information returned by a second network terminal in response to the computing power sharing request, where the second network terminal is a computing power demand terminal or a computing power providing terminal belonging to a V-PLMN. The fourth obtaining module is further configured to obtain second sharing request response information returned by a third network terminal in response to the computing power sharing request, where the third network terminal is a computing power demand terminal or a computing power providing terminal belonging to an H-PLMN. The second processing module is further configured to generate computing power sharing request response information by processing the computing power sharing request based on at least one of the first sharing request response information or the second sharing request response information. The fourth sending module is further configured to send the computing power sharing request response information to the first network terminal.

Implementations of the disclosure further provide a CPSF. The CPSF includes a transceiver, a processor, a memory, and a computer program stored on the memory and executed by the processor. The processor is coupled with the transceiver and the memory and is configured to implement the method for computing power sharing of the first aspect or the third aspect or the fifth aspect by executing the computer program.

Implementations of the disclosure further provide a non-transitory computer storage medium. The non-transitory computer storage medium stores a computer program. The computer program includes program instructions which, when executed by a processor, perform the method for computing power sharing of any of the first aspect or the third aspect or the fifth aspect.

The above implementations are merely some implementations of this disclosure. Apparently, the above implementations cannot be used to limit the scope of the disclosure. Therefore, equivalent modification made based on the claims of the disclosure still belong to the scope of the disclosure covered.

What is claimed is:

1. A method for computing power sharing, applied to a visit computing power sharing function (V-CPSF) coupled with a home computing power sharing function (H-CPSF), wherein the V-CPSF and the H-CPSF are each a computing power sharing function (CPSF) and the CPSF is connected with a network for control plane transmission and data plane transmission, or the CPSF is connected with the network for control plane transmission, and the method comprises:
  obtaining a sharing authorization request sent by a first network terminal, wherein the first network terminal is a roaming computing power demand terminal or a roaming computing power providing terminal, and the sharing authorization request carries a computing power sharing request;
  obtaining first sharing request response information returned by a second network terminal in response to the computing power sharing request, wherein the second network terminal is a computing power demand terminal or a computing power providing terminal belonging to a visit public land mobile network (V-PLMN);
  sending the sharing authorization request and the first sharing request response information to the H-CPSF;
  obtaining authorization request response information generated by processing the sharing authorization request by the H-CPSF, wherein when the sharing authorization request passes, the authorization request response information comprises a computing power sharing request response information generated by processing the computing power sharing request by the H-CPSF based on at least one of the first sharing request response information or second sharing request response information, and wherein the second sharing request response information is response information returned by a third network terminal in response to the computing power sharing request, and the third network terminal is a computing power demand terminal or a computing power providing terminal belonging to a home public land mobile network (H-PLMN); and
  sending the authorization request response information to the first network terminal.

2. The method of claim 1, wherein
  the computing power sharing request comprises first computing power demand information or first available computing power information of the first network terminal;
  the first sharing request response information comprises second available computing power information returned in response to the first computing power demand information or second computing power demand information returned in response to the first available computing power information; and
  the second sharing request response information comprises third available computing power information returned in response to the first computing power demand information or third computing power demand information returned in response to the first available computing power information.

3. The method of claim 2, wherein the computing power demand information comprises a computation amount required by a sharing computing task or the available computing power information comprises a computation amount that can be provided by a network terminal.

4. The method of claim 3, wherein
  the computing power demand information further comprises at least one of: effective time of the computing power demand information, acceptable longest computation time for completing the sharing computing task, a maximum task parallelism, an algorithm complexity of the sharing computing task, or a specified collected data type; or
  the available computing power information further comprises at least one of: effective time of the available computing power information, time required to provide the computation amount, a maximum task parallelism, or an algorithm complexity that can be handled.

5. The method of claim 2, further comprising:
  when the computing power sharing request comprises the first computing power demand information of the first network terminal and a network terminal expects to participate in computing power sharing, returning participatory computing power information of the network terminal in response to the computing power sharing request; or
  when the network terminal expects to perform task allocation and information integration on a sharing computing task in computing power sharing, returning integration capability information of the network terminal in response to the computing power sharing request, wherein
  the network terminal is the second network terminal or the third network terminal.

6. The method of claim 2, wherein
  when the computing power sharing request comprises the first computing power demand information of the first network terminal and the first network terminal expects to participate in computing power sharing, the computing power sharing request comprises participatory computing power information of the first network terminal; or
  when the first network terminal expects to perform task allocation and information integration on a sharing computing task in computing power sharing, the computing power sharing request comprises integration capability information of the first network terminal.

7. The method of claim 1, wherein
  the sharing authorization request further carries an identifier (ID) of the first network terminal; and
  obtaining the authorization request response information generated by processing the sharing authorization request by the H-CPSF comprises:
    determining whether the first network terminal has matched computing power signing information by querying a computing power signed database of the H-PLMN based on the ID of the first network terminal, wherein the computing power signed database comprises a correspondence between IDs of a plurality of first network terminals and computing power signing information, and the computing power signing information comprises signing information of a computing power demander or signing information of a computing power provider, wherein the authorization request response information comprises authorization success information, based on a determination that the first network terminal has matched computing power signing information; the authorization request response information comprises authorization failure information, based on a determination that the first network terminal does not have matched computing power signing information.

8. The method of claim 1, further comprising:
when the V-CPSF expects to participate in computing power sharing, sending participatory computing power information of the V-CPSF to the H-CPSF, so that the computing power sharing request response information is generated by processing the computing power sharing request by the H-CPSF based on at least one of the participatory computing power information of the V-CPSF, the first sharing request response information, or the second sharing request response information; or
when the H-CPSF expects to participate in computing power sharing, the computing power sharing request response information is generated by processing the computing power sharing request by the H-CPSF based on at least one of participatory computing power information of the H-CPSF, the first sharing request response information, or the second sharing request response information.

9. The method of claim 1, wherein the network is a core network and wherein
the CPSF interacts with a unified data management (UDM) function of the core network through a first reference point, the CPSF interacts with an access and mobility management function (AMF) of the core network through a second reference point, and the CPSF interacts with a user plane function (UPF) of the core network through a third reference point; or
the CPSF interacts with the UDM function of the core network through the first reference point, and the CPSF interacts with the AMF of the core network through the second reference point.

10. The method of claim 1, wherein the H-CPSF interacts with the V-CPSF through a fourth reference point.

11. A non-transitory computer storage medium storing a computer program, the computer program comprising program instructions which, when executed by a processor, cause the processor to perform a method for computing power sharing, the method being applied to a visit computing power sharing function (V-CPSF) coupled with a home computing power sharing function (H-CPSF), wherein the computing power sharing function (CPSF) is connected with a network for control plane transmission and data plane transmission, or the CPSF is connected with the network for control plane transmission, and the method comprises:
obtaining a sharing authorization request sent by a first network terminal, wherein the first network terminal is a roaming computing power demand terminal or a roaming computing power providing terminal, and the sharing authorization request carries a computing power sharing request;
obtaining first sharing request response information returned by a second network terminal in response to the computing power sharing request, wherein the second network terminal is a computing power demand terminal or a computing power providing terminal belonging to a visit public land mobile network (V-PLMN);
sending the sharing authorization request and the first sharing request response information to the H-CPSF;

obtaining authorization request response information generated by processing the sharing authorization request by the H-CPSF, wherein when the sharing authorization request passes, the authorization request response information comprises a computing power sharing request response information generated by processing the computing power sharing request by the H-CPSF based on at least one of the first sharing request response information or second sharing request response information, and wherein the second sharing request response information is response information returned by a third network terminal in response to the computing power sharing request, and the third network terminal is a computing power demand terminal or a computing power providing terminal belonging to a home public land mobile network (H-PLMN); and
sending the authorization request response information to the first network terminal.

12. A visit computing power sharing function (V-CPSF), connected with a network for control plane transmission and data plane transmission or connected with the network for control plane transmission, and comprising:
a transceiver;
a memory storing computer programs; and
a processor coupled with the memory and the transceiver and configured to invoke the computer programs to:
obtain a sharing authorization request sent by a first network terminal, wherein the first network terminal is a roaming computing power demand terminal or a roaming computing power providing terminal, and the sharing authorization request carries a computing power sharing request;
obtain first sharing request response information returned by a second network terminal in response to the computing power sharing request, wherein the second network terminal is a computing power demand terminal or a computing power providing terminal belonging to a visit public land mobile network (V-PLMN);
cause the transceiver to send the sharing authorization request and the first sharing request response information to the H-CPSF;
obtain authorization request response information generated by processing the sharing authorization request by the H-CPSF, wherein when the sharing authorization request passes, the authorization request response information comprises a computing power sharing request response information generated by processing the computing power sharing request by the H-CPSF based on at least one of the first sharing request response information or second sharing request response information, and wherein the second sharing request response information is response information returned by a third network terminal in response to the computing power sharing request, and the third network terminal is a computing power demand terminal or a computing power providing terminal belonging to a home public land mobile network (H-PLMN); and
cause the transceiver to send the authorization request response information to the first network terminal.

13. The V-CPSF of claim 12, wherein
the computing power sharing request comprises first computing power demand information or first available computing power information of the first network terminal;

the first sharing request response information comprises second available computing power information returned in response to the first computing power demand information or second computing power demand information returned in response to the first available computing power information; and the second sharing request response information comprises third available computing power information returned in response to the first computing power demand information or third computing power demand information returned in response to the first available computing power information.

14. The V-CPSF of claim 13, wherein the computing power demand information comprises a computation amount required by a sharing computing task or the available computing power information comprises a computation amount that can be provided by a network terminal.

15. The V-CPSF of claim 14, wherein
the computing power demand information further comprises at least one of: effective time of the computing power demand information, acceptable longest computation time for completing the sharing computing task, a maximum task parallelism, an algorithm complexity of the sharing computing task, or a specified collected data type; or the available computing power information further comprises at least one of: effective time of the available computing power information, time required to provide the computation amount, a maximum task parallelism, or an algorithm complexity that can be handled.

16. The V-CPSF of claim 13, wherein the processor is further configured to:
when the computing power sharing request comprises the first computing power demand information of the first network terminal and a network terminal expects to participate in computing power sharing, cause the transceiver to return participatory computing power information of the network terminal in response to the computing power sharing request; or when the network terminal expects to perform task allocation and information integration on a sharing computing task in computing power sharing, cause the transceiver to return integration capability information of the network terminal in response to the computing power sharing request, wherein the network terminal is the second network terminal or the third network terminal.

17. The V-CPSF of claim 13, wherein
when the computing power sharing request comprises the first computing power demand information of the first network terminal and the first network terminal expects to participate in computing power sharing, the computing power sharing request comprises participatory computing power information of the first network terminal; or when the first network terminal expects to perform task allocation and information integration on a sharing computing task in computing power sharing, the computing power sharing request comprises integration capability information of the first network terminal.

18. The V-CPSF of claim 12, wherein
the sharing authorization request further carries an identifier (ID) of the first network terminal; and the processor configured to generate the authorization request response information by processing the sharing authorization request by the H-CPSF is configured to:
determine whether the first network terminal has matched computing power signing information by querying a computing power signed database of the H-PLMN based on the ID of the first network terminal, wherein the computing power signed database comprises a correspondence between IDs of a plurality of first network terminals and computing power signing information, and the computing power signing information comprises computing power demander signing information or computing power provider signing information, wherein the authorization request response information comprises authorization success information, based on a determination that the first network terminal has matched computing power signing information; the authorization request response information comprises authorization failure information, based on a determination that the first network terminal does not have matched computing power signing information.

19. The V-CPSF of claim 12, wherein
the processor is further configured to: when the V-CPSF expects to participate in computing power sharing, cause the transceiver to send participatory computing power information of the V-CPSF to the H-CPSF, so that the computing power sharing request response information is generated by processing the computing power sharing request by the H-CPSF based on at least one of the participatory computing power information of the V-CPSF, the first sharing request response information, or the second sharing request response information; or when the H-CPSF expects to participate in computing power sharing, the computing power sharing request response information is generated by processing the computing power sharing request by the H-CPSF based on at least one of participatory computing power information of the H-CPSF, the first sharing request response information, or the second sharing request response information.

20. The V-CPSF of claim 12, wherein the network is a core network and wherein
the CPSF interacts with a unified data management (UDM) function of the core network through a first reference point, the CPSF interacts with an access and mobility management function (AMF) of the core network through a second reference point, and the CPSF interacts with a user plane function (UPF) of the core network through a third reference point; or the CPSF interacts with the UDM function of the core network through the first reference point, and the CPSF interacts with the AMF of the core network through the second reference point.

* * * * *